United States Patent
Lirbank et al.

(10) Patent No.: US 9,965,294 B2
(45) Date of Patent: May 8, 2018

(54) METHODS, DEVICES, AND SYSTEMS FOR ESTABLISHING, SETTING-UP, AND MAINTAINING A VIRTUAL COMPUTER INFRASTRUCTURE

(71) Applicant: CLEARCENTER, CORP., Orem, UT (US)

(72) Inventors: Mikael Lirbank, Gothenburg (SE); Daniel Riveiro, Malmo (SE)

(73) Assignee: CLEARCENTER, CORP., Orem, UT (US)

( * ) Notice: Subject to any disclaimer, the term of this patent is extended or adjusted under 35 U.S.C. 154(b) by 126 days.

(21) Appl. No.: 15/173,035

(22) Filed: Jun. 3, 2016

(65) Prior Publication Data
US 2016/0321085 A1 Nov. 3, 2016

Related U.S. Application Data

(62) Division of application No. 13/460,660, filed on Apr. 30, 2012, now Pat. No. 9,384,032.

(60) Provisional application No. 61/480,294, filed on Apr. 28, 2011.

(51) Int. Cl.
*G06F 9/44* (2018.01)
*G06F 9/455* (2018.01)

(52) U.S. Cl.
CPC .......... *G06F 9/4416* (2013.01); *G06F 9/4406* (2013.01); *G06F 9/45558* (2013.01); *G06F 2009/4557* (2013.01)

(58) Field of Classification Search
CPC .. G06F 9/4406; G06F 9/4416; G06F 9/45558; G05F 2009/4557
See application file for complete search history.

(56) References Cited

U.S. PATENT DOCUMENTS

| | | | |
|---|---|---|---|
| 8,001,581 B2 | 8/2011 | Ford et al. | |
| 8,005,983 B2 | 8/2011 | Hopen et al. | |
| 8,010,635 B2 | 8/2011 | Richter | |
| 8,498,997 B2 * | 7/2013 | Murase | G06F 9/5088 707/764 |
| 8,532,970 B2 * | 9/2013 | White | G09B 19/0053 703/13 |
| 9,753,758 B1 * | 9/2017 | Oldenburg | G06F 9/45558 |
| 2003/0046529 A1 * | 3/2003 | Loison | G06F 9/4416 713/2 |
| 2005/0149529 A1 * | 7/2005 | Gutmans | H04L 69/16 |
| 2005/0198233 A1 | 9/2005 | Manchester et al. | |

* cited by examiner

*Primary Examiner* — Mark Connolly
(74) *Attorney, Agent, or Firm* — Phillips, Ryther & Winchester; Justin K. Flanagan

(57) ABSTRACT

A system and method of operating an electronic device may include loading an operating system, from a boot key, on the electronic device during turn-on of the electronic device. The operating system may be operated on the electronic device. The boot key may cause the electronic device to automatically communicate with a web-service located on a communications network to enable executable instructions from the web-service to be communicated to the electronic device for execution thereon.

5 Claims, 22 Drawing Sheets

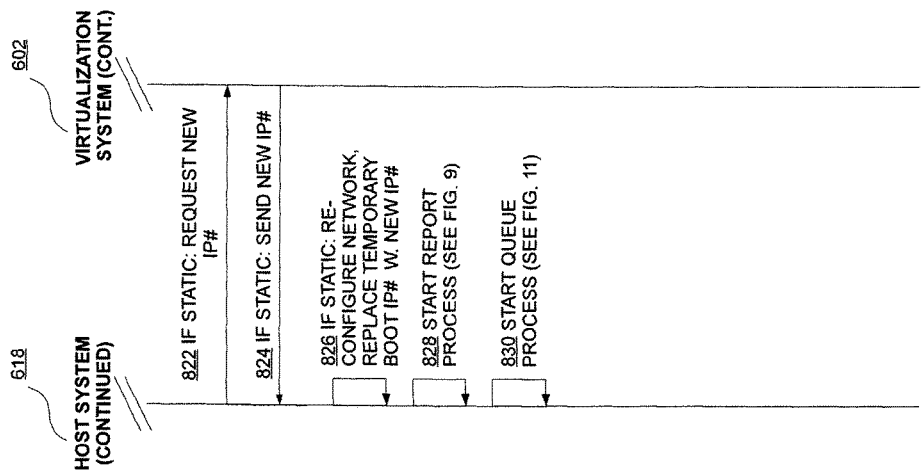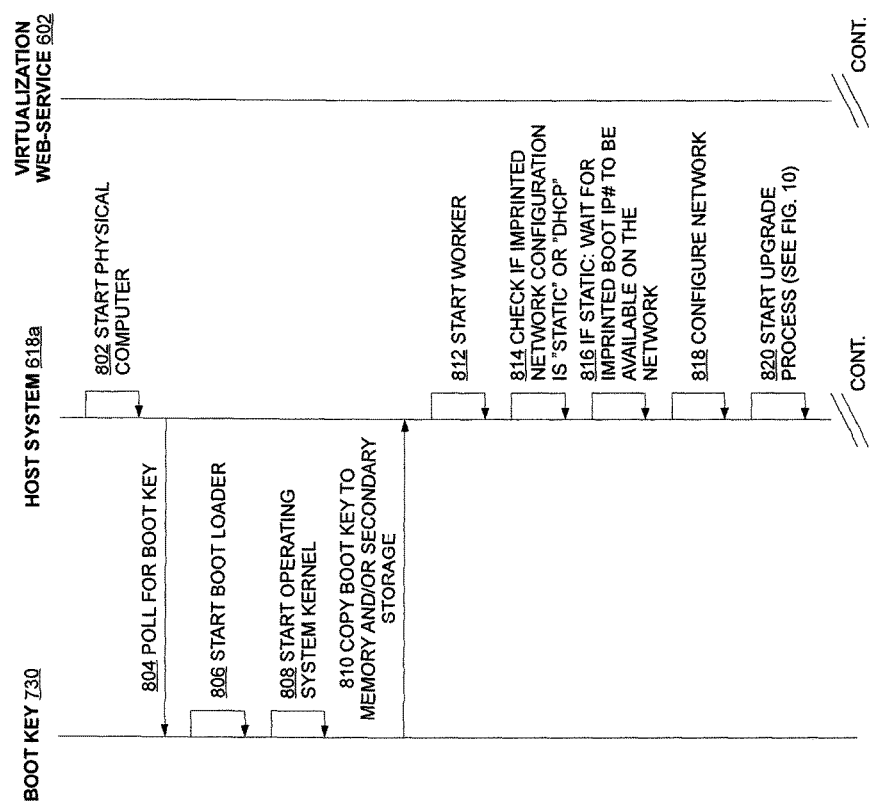
FIG. 8

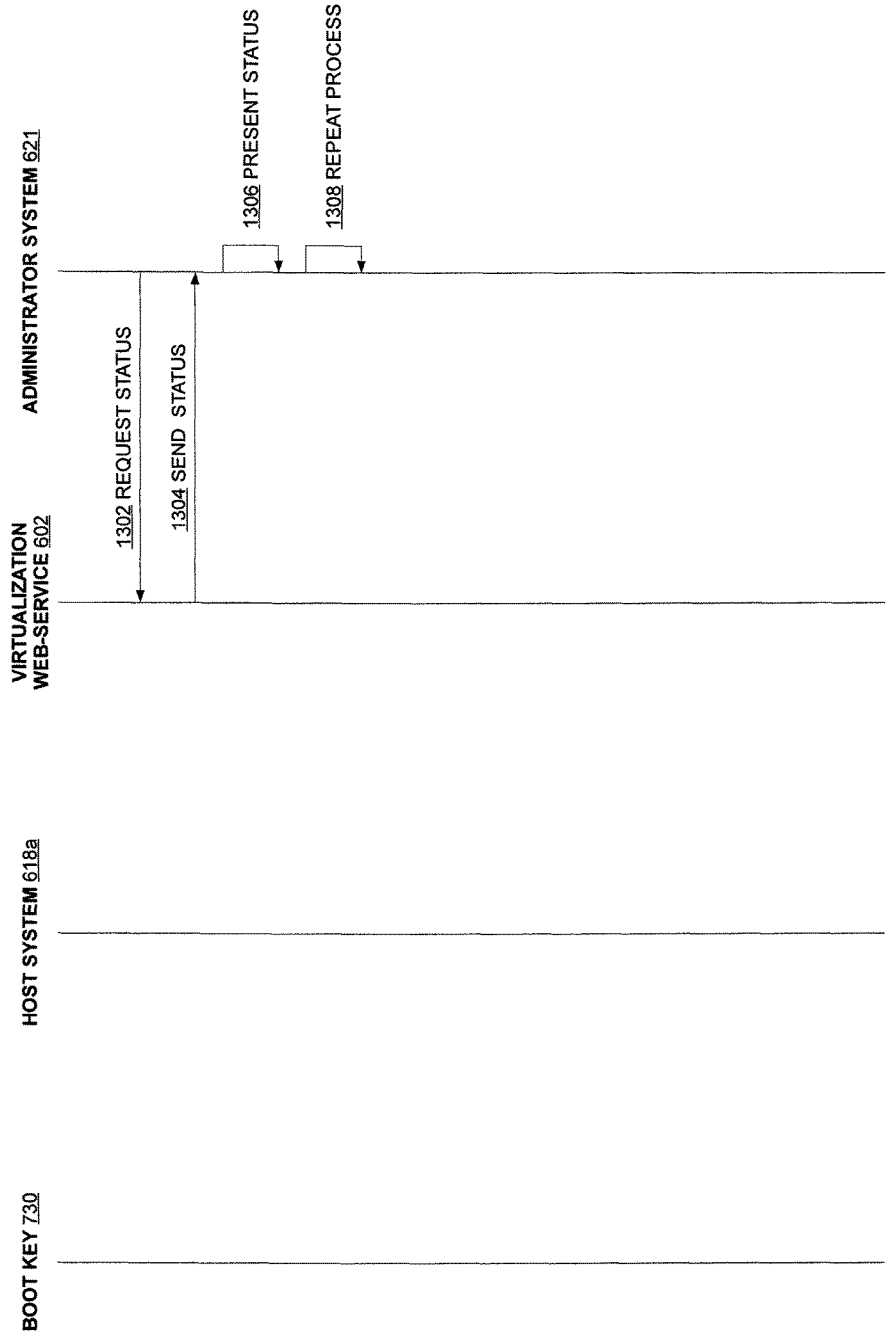

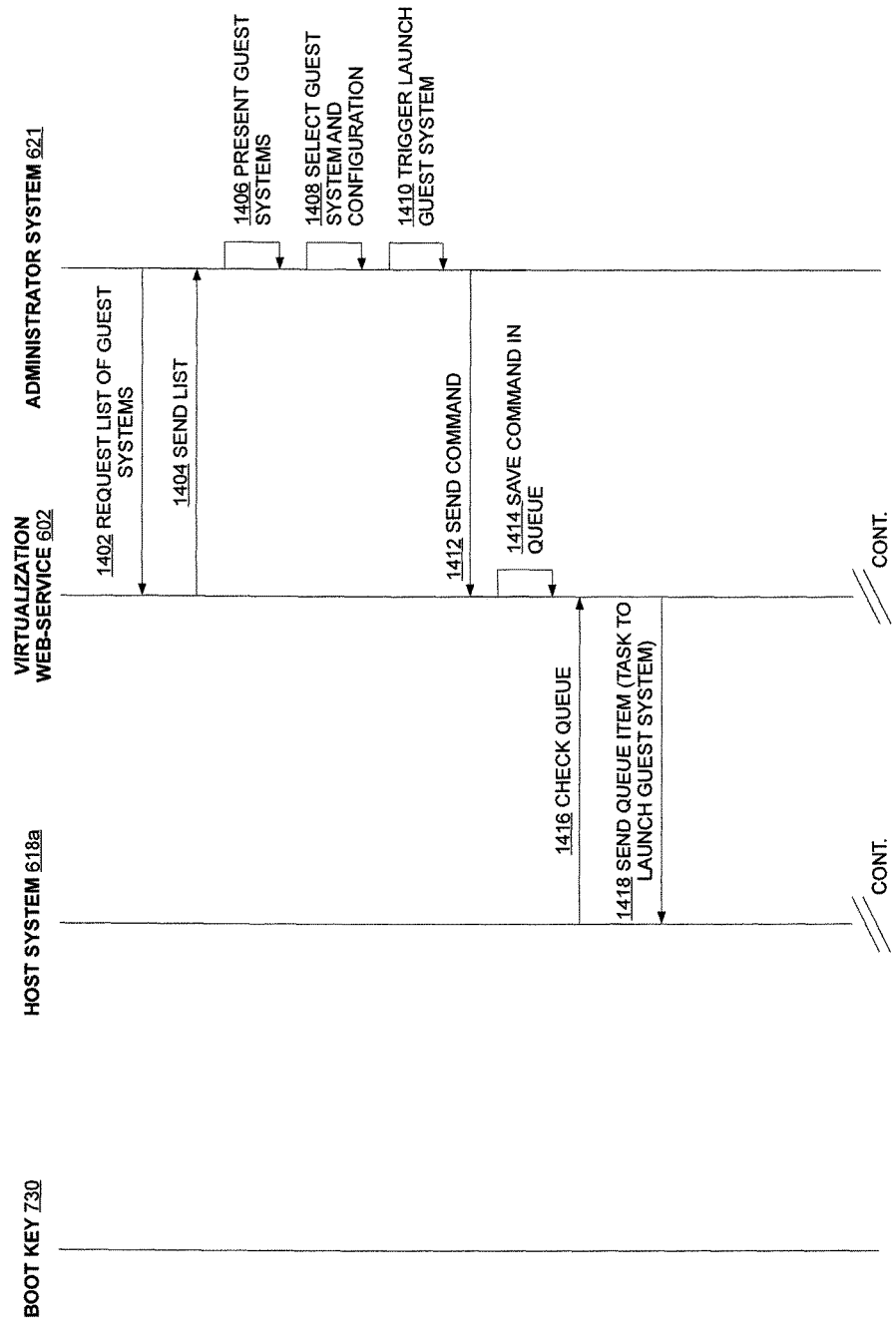

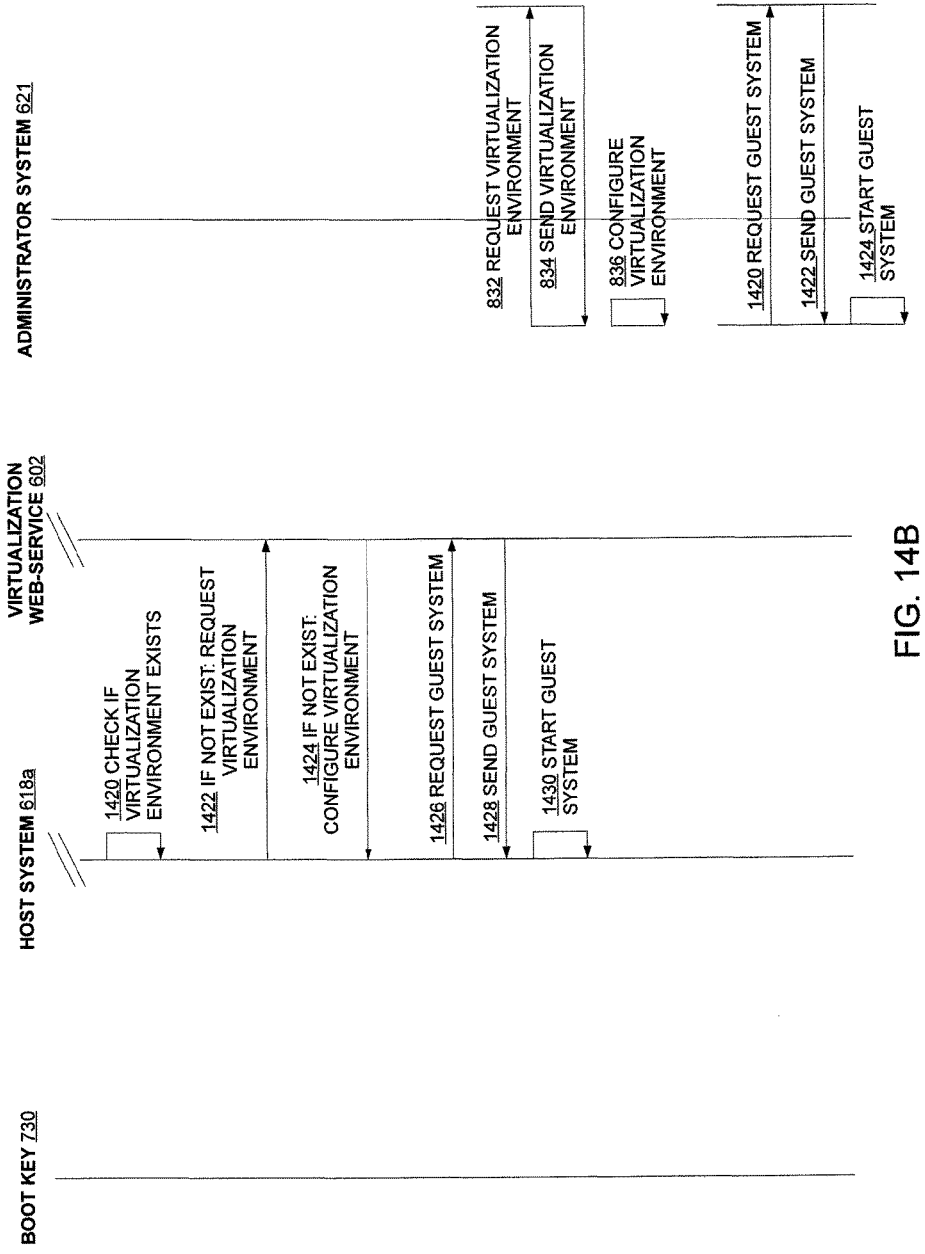

FIG. 18

| Virtual Machines | | | | |
|---|---|---|---|---|
| Name | Location | IP | | |
| ○ Debian 5.0 64-bit | Witsbits - private | -n/a- | △ | ⓘ ✎ ⊖ ⇥ ✗ ⚙ ⊖ |
| ○ Debian 5.0 64-bit | Witsbits - public | -n/a- | △ | ⓘ ✎ ⊖ ⇥ ✗ ⚙ ⊖ |
| ○ Ubuntu 11.04 server 64-bit | Witsbits - public | -n/a- | △ | ⓘ ✎ ⊖ ⇥ ✗ ⚙ ⊖ |
| ○ Windows Server 2008 Enterprise 64-bit | Witsbits - public | -n/a- | △ | ⓘ ✎ ⊖ ⇥ ✗ ⚙ ⊖ |
| ◉ Accounting (win) | DELL PowerEdge M610 | 199.16.201.195 | △ | ⓘ ✎ ⊖ ⇥ ✗ ⚙ ⊖ |
| ○ Test Server | DELL PowerEdge M610 | 199.16.201.197 | △ | ⓘ ✎ ⊖ ⇥ ✗ ⚙ ⊖ |
| ◉ Debian 5.0 64-bit | DELL PowerEdge M610 | 199.16.201.196 | △ | ⓘ ✎ ⊖ ⇥ ✗ ⚙ ⊖ |
| ○ (Backup) Debian 5.0 64-bit | DELL PowerEdge M610 | -n/a- | △ | ⓘ ✎ ⊖ ⇥ ✗ ⚙ ⊖ |
| ◉ My New Virtual Machine | DELL PowerEdge M610 | 199.16.201.197 | △ | ⓘ ✎ ⊖ ⇥ ✗ ⚙ ⊖ |

METHODS, DEVICES, AND SYSTEMS FOR ESTABLISHING, SETTING-UP, AND MAINTAINING A VIRTUAL COMPUTER INFRASTRUCTURE

BACKGROUND OF THE INVENTION

Computing systems these days have significantly more processing capabilities that traditionally have existed in the past and each single server is capable of supporting more users than ever before. Historically and technically speaking, servers have a configuration of a physical computer (i.e., computer hardware) on which an operating system resides, where the operating system is used to interface with the physical computer and manage applications that are utilized by users of the server.

As a result of the power of today's servers, it has become fairly common that servers within an organization operate with five-percent (5%) utilization when configured with an historic configuration (i.e., operating system and applications operating on a physical computer). Because of the low utilization of the servers, rather than buying more servers, hardware virtualization has developed, where multiple virtual machines are established on a physical computer and the virtual machines operating on the physical computer are managed thereon. These virtual machines may be created to operate applications and be configured to manage different groups of users, for example, as would be a physical computer. Conventional virtualization is deployed in a very similar manner as conventional software, where downloaded software or computer disk are used to install the virtualization technology and supporting tools by an information technology (IT) professional, and the IT professional manages the virtualization technology and supporting tools in a similar manner as managing other software applications.

Because of overhead requirements for hardware virtualization, hardware virtualization has traditionally been utilized by large companies that can afford the overhead that comes with managing such a configuration. That is, although multiple virtual machines can be operated on a single physical computer, there are inherent management requirements that the company has to absorb in managing installed virtualization technologies, virtual machines and the supporting tools, where the management requirements include maintaining, upgrading, performing compliance management, backing-up, and so forth, as understood in the art. While multiple virtual servers may be placed onto a single physical computer, a separate management system is utilized. For small companies, hardware virtualization is generally a luxury that cannot be afforded despite benefits that are provided by hardware virtualization.

SUMMARY

To provide companies, both large and small, with the ability to use hardware virtualization with lower overhead than conventional virtualization of servers, the principles of the present invention provides for a web-service based virtualization solution that allows customers to deploy and manage virtual servers. The virtualization solution allows for customers to significantly reduce the amount of overhead that typically comes with hardware virtualization as an operator of the virtualization solution may manage updates, upgrades, configuration management, and so on, of the virtualized environment.

The principles of the present invention may include two components, 1) a remote virtualization distribution and management system hosted by a third party and 2) a boot key that (i) boots (i.e., starts-up) an empty physical server, (ii) network enables the empty physical server, and (iii) connects the empty physical server with the remote virtualization distribution and management system.

One embodiment of a boot key may include an operating system configured to be executed by a computing system, and a boot loader configured to cause the operating system to be loaded by the computing system during turn-on of the computing system. A worker may be configured to work in conjunction with the operating system, and be configured to cause the computing system to automatically communicate with a web-service located on a communications network.

One method of operating an electronic device may include loading an operating system, from a boot key, on the electronic device during turn-on of the electronic device. The operating system may be operated on the electronic device. The boot key may cause the electronic device to automatically communicate with a web-service located on a communications network to enable executable instructions from the web-service to be communicated to the electronic device for execution thereon.

One method of a system for establishing and managing virtual servers on multiple host servers may include a storage unit configured to store a virtual server, an input/output (I/O) unit configured to communicate over a communications network, and a processing unit in communication with the storage unit and I/O unit. The processing unit may be configured to process a command received from an administrator system of a customer via a communications network, the command may include a request to download communicate a virtual server stored on the storage unit to a host server of a customer. The processing unit may further be configured to access the virtual server stored on the storage unit in response to processing the command, and to communicate the virtual server via the I/O unit and communications network to the host servers for execution thereon.

Definitions

"Physical computer" refers to a physical hardware (e.g. a real computer).

"Virtual machine" refers to virtual (i.e. software based) hardware, which is the virtual equivalent of a physical computer.

"Host system" refers to a physical computer running an operating system, possibly applications, and/or virtualization environment. The host system is also referred to herein as a host server.

"Boot key" refers to a device or software that includes machine-readable instructions to cause a host system, when turned on, to communicate with a web-service. One use of a boot key is to cause a "blank" host system to communicate with a web-service that is configured to deliver a virtualization environment and one or more virtual machines for storage and operation on the hose system.

"Guest system" refers to a virtual machine running an operating system and possibly applications.

BRIEF DESCRIPTION OF THE DRAWINGS

The principles of the present invention are illustrated by way of example, and not limitation, in the figures of the accompanying drawings in which:

FIG. 8 is a diagram of an illustrative setup or startup process in accordance with the principles of the present invention;

FIG. 13 is a diagram of an illustrative status process that provides for the administrator system to provide a user with status of the virtualization web-service, host system(s), and guest system(s);

FIGS. 14A and 14B provide a diagram of an illustrative launch virtual machine process to enable a user to launch a virtual machine or server on the host server.

FIG. 18 is a screen shot of the GUI showing that the virtual machine has been downloaded and is now running on the host server.

DETAILED DESCRIPTION OF THE DRAWINGS

Figure 1A:
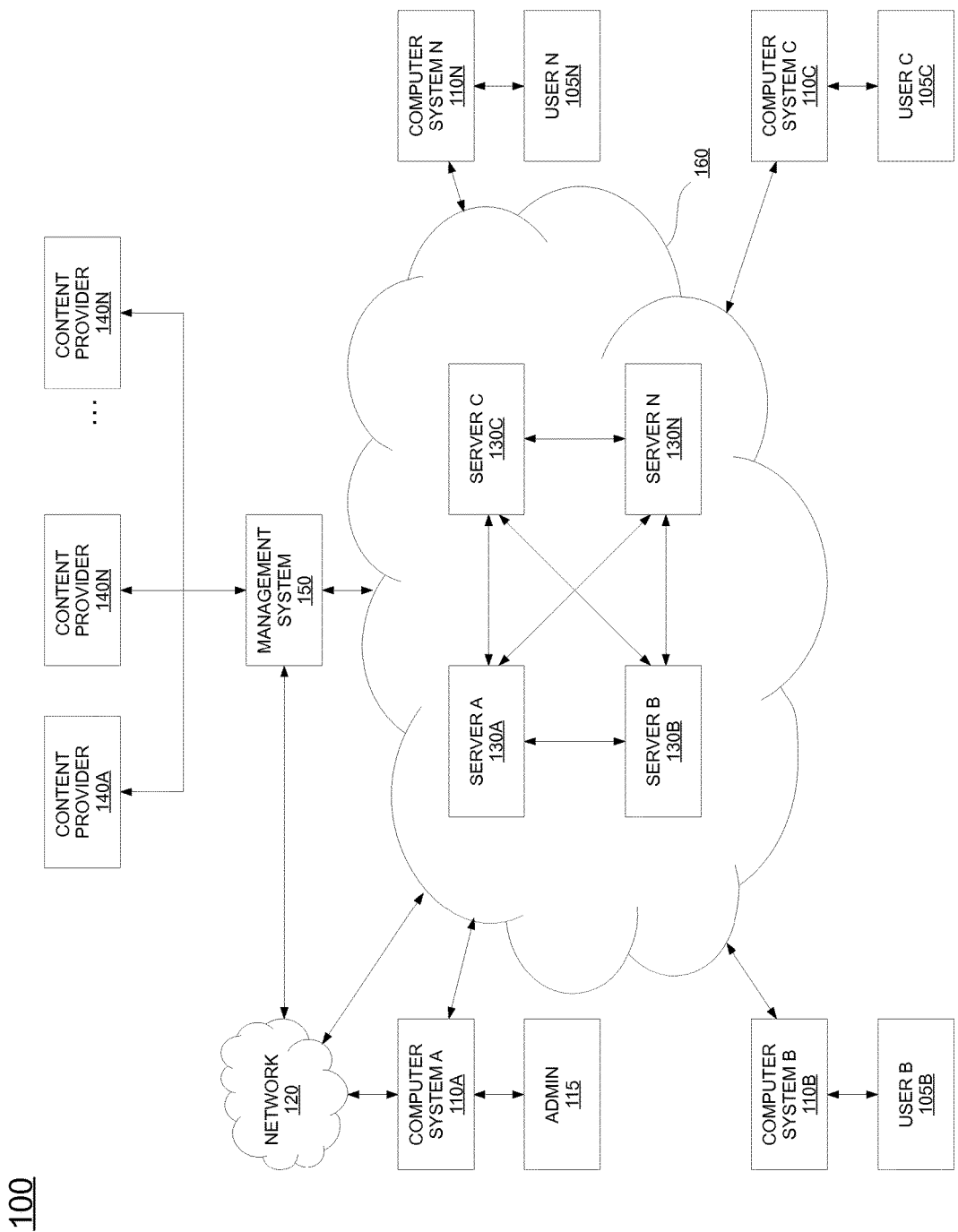
FIGS. 1A and 1B are block diagrams of a communication system, in accordance with embodiments of the present invention.

Referring first to FIG. 1A, an example of a system 100 including elements thereof configured to establish and/or manage a virtual computer infrastructure is depicted. Users B-N 105B-N interact with system 100 via computer systems B-N 110B-N (the user's computer system), which are communicatively coupled to a virtual computer infrastructure 160 via communication links and/or a network 120, such as a wide area network (WAN) (e.g., the Internet) (communication links between users 105B-N and network 120 not shown). A user may be any individual, group, organization, or machine that communicates with one or more computer systems B-N 110B-N or virtual computer infrastructure 160.

Virtual computer infrastructure 160 may include any number of servers 130A-N communicatively coupled to one another in, for example, a distributed, virtual, and/or cloud or web-based arrangement, and/or may be distributed geographically or logically. Virtual computer infrastructure 160 may be established and/or managed by management system 150. Servers 130A-N may be any conventionally available server and may be administrated by, for example, an administrator 115 via the computer system A 110A.

Computer systems 110A-N may be any computer system (physical or virtual) enabled to execute the methodologies described herein, such as a personal computer (PC), a tablet computer (e.g., an iPad™), a mobile communications device (e.g., BlackBerry™, iPhone™, etc.), and/or a portable computer system (e.g., a laptop computer, desktop computer, etc.). In some embodiments, computer systems 110 may be communicatively coupled to virtual computer infrastructure 160 via, for example, a direct communication link and/or network 120 using, for example, a wired or wireless connection to a modem or similar equipment that couples computer systems 110A-N to network 120 in order to exchange data therewith, and, in turn, delivers data to and/or from computer systems 110A-N from virtual computer infrastructure 160. Network 120 may be any network enabling communication between computer systems 110A-N and virtual computer infrastructure 160, such as the Internet, a local area network (LAN), a wireless local area network (WLAN), and/or any other appropriate network.

Management system 150 may remotely set-up, establish, and/or maintain virtual computer infrastructure 160. Management system 150 may further be enabled to receive one or more instructions for executing one or more of the methodologies described herein from user 105 and/or administrator 115 via, for example, a communication interface that is configured to receive commands via one or more customary human-computer interface elements, such as a keyboard, joystick, mouse, touch pad, touch screen, etc. On some occasions, management system 150 may receive an instruction to access and/or search for content stored, for example, internally and/or in content providers 140A-N. Content may be collected or channeled by management system 150 from one more content providers 140A-140N at/through virtual computer infrastructure 160 and may be delivered from virtual computer infrastructure 160 to computer systems 110A-N via communication links and/or network 120. Exemplary content includes software and data files that may, for example, enable management system 150 to construct a hybrid cloud or web-based virtualization service and/or enable a third party to access and/or use one or more virtual computer infrastructures 160. Exemplary content providers 140A-140N include websites and databases.

Figure 1B:
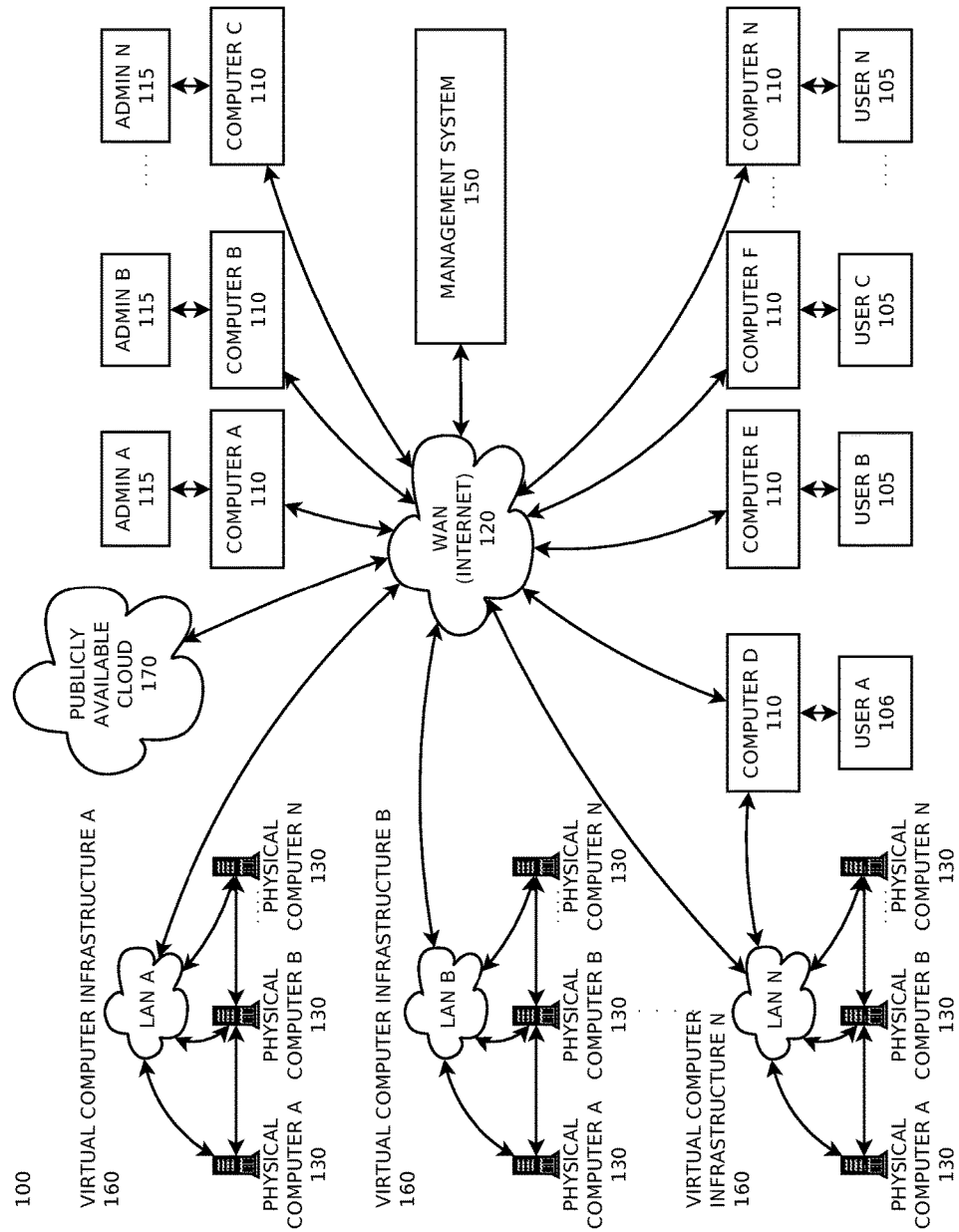

FIG. 1B is a block diagram illustrating another example of a communication network 101 that includes multiple virtual computer infrastructures a-n 160a-n managed by management system 150. As illustrated in communication network 101, multiple virtual computer infrastructures a-n 160a-n may be set up, managed, and/or maintained by management system 150 via 120 network. On some occasions, one or more of the virtual computer infrastructures a-n 160a-n may be managed by a user, such as user 105A-N, and/or an administrator 115A-N via network 120 and/or management system 150. In this way, management system 150 may manage not only multiple servers in a virtual computer infrastructure, such as virtual computer infrastructure 160, but also multiple virtual computer infrastructures where each virtual computer infrastructure may include one or more servers.

On some occasions, virtual computer infrastructures 160 A-N may be communicatively coupled to one another and may jointly provide services to and/or share capacity with one or more users 105A-N. On other occasions, virtual computer infrastructures 160 A-N may be independent from one another and may jointly, or singularly, provide services to one or more users 105A-N.

Operators and/or administrators of a virtual computer infrastructure 160A may allow other virtual computer infrastructures, such as virtual computer infrastructure 160B-N, to access capacity available via virtual computer infrastructure 160A on, for example, an as needed, demand, and/or periodic basis. In some embodiments, a fee may be charged by, for example, management system 150 for utilization of virtual computer infrastructure 160A.

Optionally, a publicly available cloud 170 may be included in system 101 and one or more users 105A-N, computers 110A-N, and/or virtual computer infrastructures 160 A-N may be enabled to communicate with publicly available cloud 170 via, for example, management system 150. A policy for communication between users 105A-N, computers 110A-N, virtual computer infrastructures 160A-N, and/or publicly available cloud 170 may be determined by, for example, management system 150 and/or an administrator of a respective user 105A-N, computer 110A-N, and/or virtual computer infrastructure 160A-N. For example, in one embodiment, a user 105A may be enabled to perform certain relatively low security functions via either publicly available cloud 170 and/or a virtual computer network 160A-N, but may be restricted to performing relatively secure function via only virtual computer networks 160 A-N. Exemplary publically available clouds 170 include the Amazon Elastic Compute Cloud (Amazon EC2), and Google Public Cloud.

Figure 2:
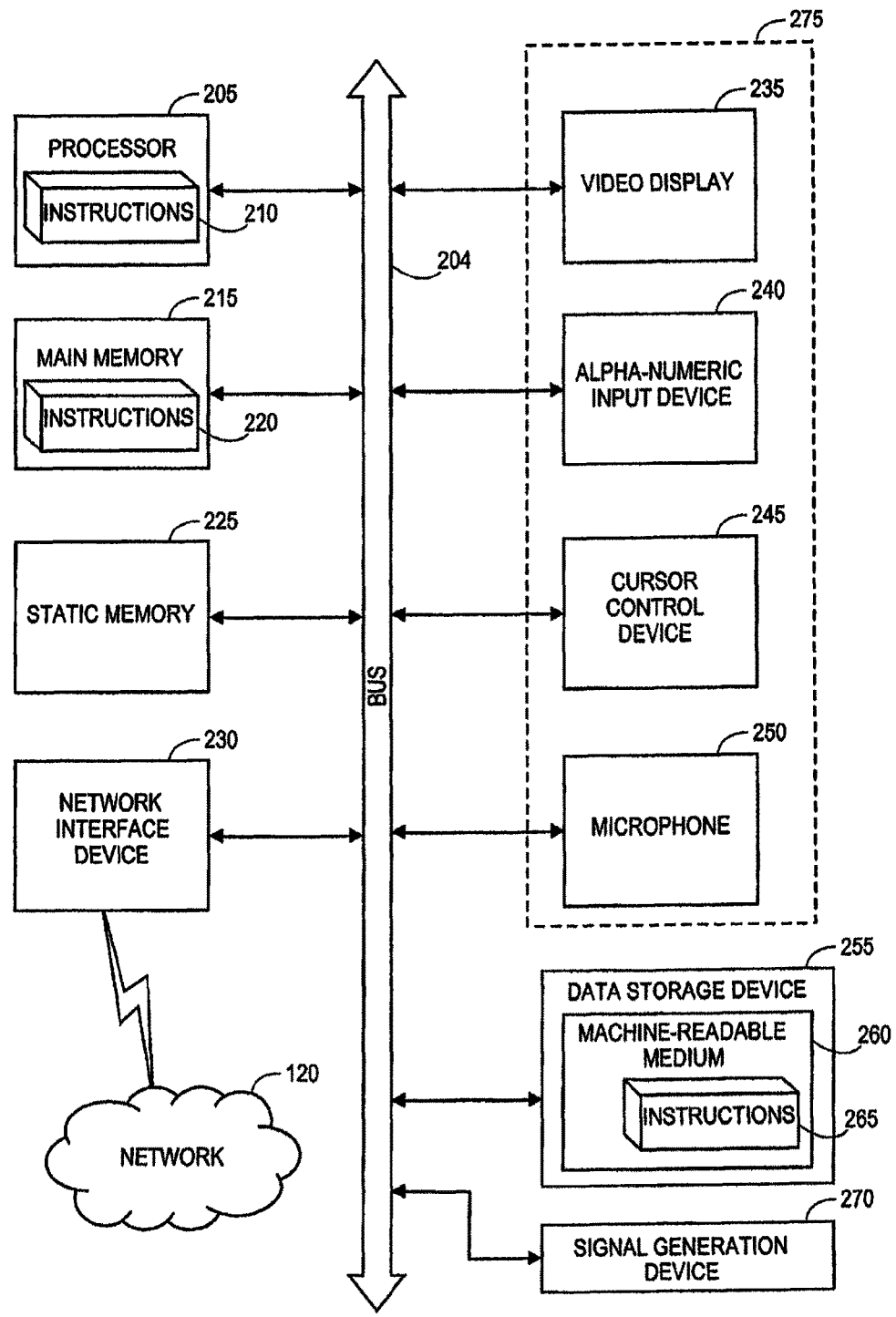
FIG. 2 is a block diagram of an exemplary management system and/or server, in accordance with embodiments of the present invention.

FIG. 2 is a block diagram illustrating one example of a management system 150 and/or a server 130 A-N within which a set of instructions 210, 220, and 265 for causing management system 150 and/or a server 130 A-N to perform any one or more of the methodologies discussed herein, may be executed. In some embodiments, management system 150 may include several machines and the methodologies discussed herein, may be executed by the several machines acting in concert with one another. In the example depicted in FIG. 2, components of management system 150 and/or a server 130 A-N are coupled directly, or indirectly, to a communication bus 204, although in other cases layers of busses or, indeed, different busses or other communication paths may be used to communicatively couple the various components of this device. It should be appreciated that the example shown in FIG. 2 is intended only as one possible management system and/or a server configuration and is not intended to limit the scope of the present invention in any way.

In alternative embodiments, management system 150 and/or a server 130 A-N operates as a standalone device or may be connected (e.g., network 120) to other machines. Management system 150 and/or a server 130 A-N includes a network interface device 230 coupled to bus 204. Network interface device 230 provides a two-way data communication path with computer systems 110A-N, content providers 140A-N, and virtual computer infrastructure 160. For example, network interface device 230 may be a wired or wireless local area network (LAN) interface to provide a data communication connection to a compatible LAN (such as a LAN that uses an IEEE 802.11a/b/g/n communication protocol). Management system 150 and/or a server 130 A-N can send messages and receive data, sets of instructions, and/or content through network interface device 230.

Management system 150 and/or a server 130 A-N also includes a processor 205 (e.g., a central processing unit (CPU), a graphics processing unit (GPU), or both), a main memory 215 (e.g., read-only memory (ROM), flash memory, dynamic random access memory (DRAM), such as synchronous DRAM (SDRAM) or Rambus DRAM (RDRAM), etc.) and a static memory 225 (e.g., flash memory, static random access memory (SRAM), etc.), which communicate with each other via bus 204 or other communication mechanism for communicating information.

Management system 150 and/or a server 130 A-N may further include a video display 235 (e.g., a liquid crystal display (LCD) or a cathode ray tube (CRT)). Management system 150 and/or a server 130 A-N also includes a communication interface 275 via which a user and/or administrator of management system 150 and/or a server 130 A-N may communicate with management system 150 and/or a server 130 A-N. For example, communication interface 275 may include an alpha-numeric input device 240 (e.g., a keyboard or a virtual keypad rendered on a touch screen), a cursor control device 245 (e.g., a mouse, joystick, or track pad), a microphone 250, and/or video display 235, in cases where video display 235 is enabled to directly receive user input. In some embodiments, management system 150 and/or a server 130 A-N may include a signal generation device 270 (e.g., a speaker or transmitter) for generating a signal, such as an audio signal for transmission to a user or administrator.

Management system 150 and/or a server 130 A-N may further include a data storage device 255 and RAM 215 for storing, for example, data or other content. Data storage device 255 may include a non-transitory machine-readable storage medium 260 on which is stored one or more sets of instructions 265 (e.g., software embodying any one or more of the methodologies or functions described herein. Set of instructions 265 may also reside, completely or partially, within main memory 215 and/or within processor 205 during execution of various operations by management system 150 and/or a server 130 A-N. In some embodiments, static memory 225 and processor 205 may also constitute non-transitory machine-readable storage media (at least in part). In some embodiments, set of instructions 265 may be distributed across a plurality of machines, management systems 150, and/or a servers 130 A-N. Set of instructions 265 may be compatible with, for example, one or more computer systems 110A-N in some cases, set of instructions 265 may be transmitted or received over a network 120 via network interface device 230 as, for example, a software application. In alternative embodiments, hard-wired circuitry may be used in place of, or in combination with, set of instructions 265 to implement the invention. Thus, embodiments of the invention are not limited to any specific combination of hardware circuitry and software.

While set of instructions 265 are shown in an exemplary embodiment to be on a single medium, the term "non-transitory machine-readable storage medium" should be taken to include a single medium or multiple media (e.g., a centralized or distributed database or data source and/or associated caches and severs) that store the one or more sets of instructions 265. The term "non-transitory machine-readable storage medium" shall also be taken to include any non-transitory medium that is capable of storing, encoding, or carrying a set of instructions for execution by management system 150 and/or a server 130 A-N and that cause management system 150 and/or a server 130 A-N to perform any one or more of the methodologies of the present invention. The term "non-transitory machine-readable storage medium" shall accordingly be taken to include, but not be limited to, solid-state memories, optical media, and magnetic media.

Figure 3:
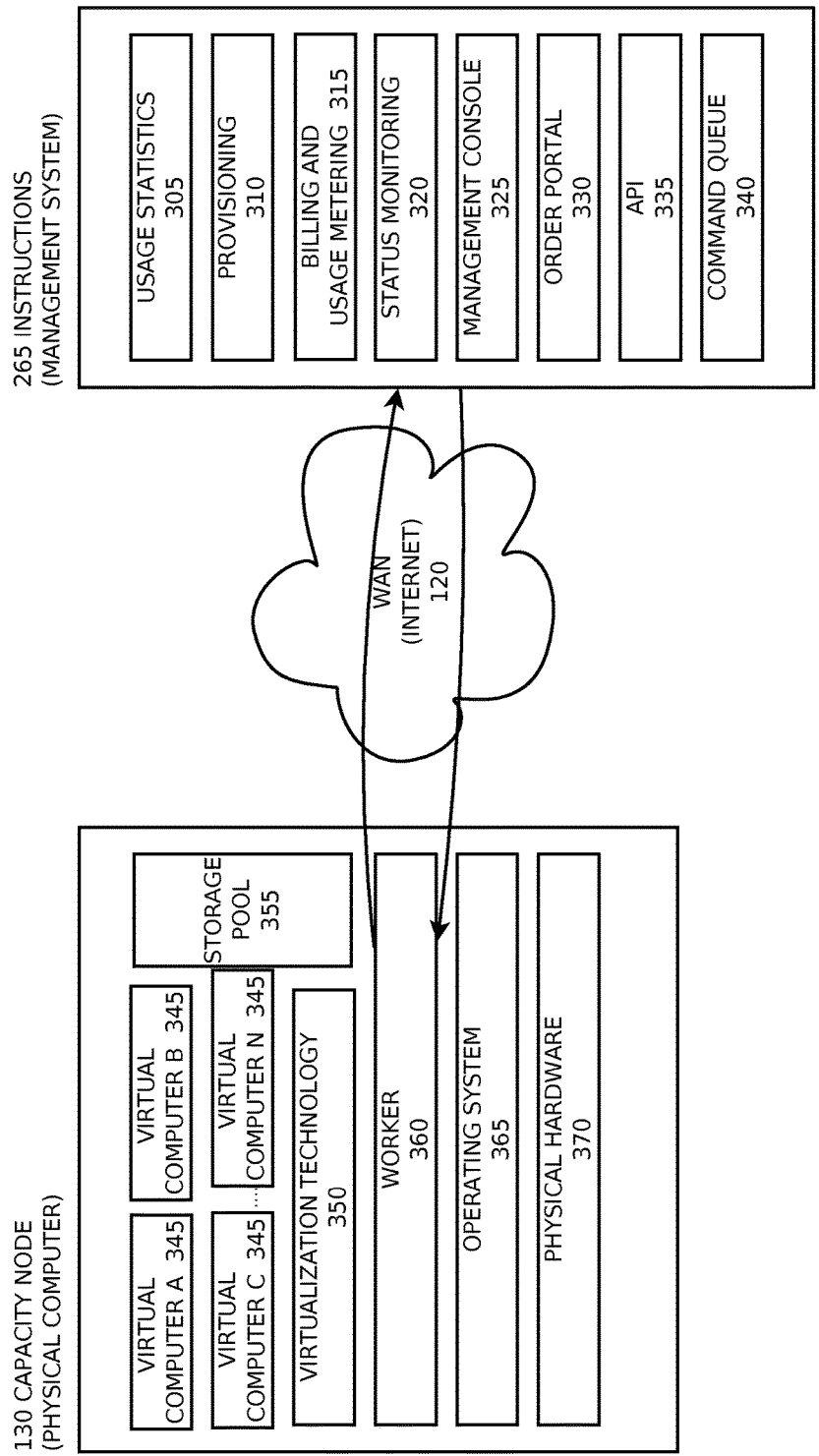
FIG. 3 is a block diagram depicting a server and a set of instructions, in accordance with embodiments of the present invention.

FIG. 3 is block diagram illustrating components included in an exemplary server 130 and exemplary sets of instructions that may be included in a set of instructions 265 as may be executed by, for example, management system 150 and/or server 130. Server 130 may include one or more virtual computers a-n 345, virtualization technology 350, a storage pool 355, a worker module 360, an operating system 365, and physical hardware 370.

Virtual computers a-n 345 may be software, hardware, or a combination of both that appears to a user, such as users 105 A-N, as a computer or component thereof (e.g., computer hard drive). Virtual computers a-n 345 may be of any size and perform any function typically performed by a computer and/or virtual computer. On some occasions, a particular virtual computer a-n 345 may physically reside in two or more servers 130.

Virtualization technology 350 may be software, hardware, or a combination of both and may be configured to enable the virtualization of server 130, or components included therein, into the one or more virtual computers a-n 345. Virtualization technology 350 may operate in conjunction with, for example, one or more sets of instructions included in set of instructions 265, such as a provisioning set of instructions 310.

Worker module 360 may be software, hardware, or a combination of both and may be configured to facilitate communication between server 130 and management system 150 and/or set of instructions 265 and execution of instructions received by server 130. In some embodiments, worker module may be software downloaded and/or updated via a network, such as network 130. In at least one embodiment, worker module 360 may include set of instructions 265 and/or a portion thereof.

Storage pool 355 may be a secondary storage device (e.g., hard drive, solid state drive, storage area network (SAN), and/or network-attached storage (NAS). In these embodiments, a memory included in, for example, physical hardware 370 may act as a primary memory.

Storage pool 355 may include virtual hard drives and/or virtual storage of guest systems. Storage pool 355 may distribute server images between different servers 130 A-N for redundancy purposes. Storage pool 355 may also distribute server images between different servers 130 A-N in order to allow worker module 360 operating on another server 130 to launch, update, and/or maintain a virtual computer, such as virtual computers 345 A-N, using the same, or a copy of, a server image.

Operating system 365 may be software, hardware, or a combination of both and may be configured to enable the operation of server 130. Physical hardware 370 include some or all of the components of server 130 as provided in FIG. 2, such as, the physical devices and/or communication interfaces, such as communication interface 275 included in server 130. Physical hardware 370 may also include a network interface, such as network interface 230 via which server 130 may communicate with a network, such as network 120 and/or other components of systems 100 and 101.

In some embodiments, one or more sets of instructions, such as virtualization technology 350, worker module 360, and operating system 365 may be downloaded from a website operated by, for example, management system 150 and by, for example, an administrator of one or more servers A-N 130A-N. Once downloaded, the sets of instructions 350, 360, and/or 365 may be stored on a computer-readable media (e.g., optical disk or flash drive) or virtual media. Saved sets of instructions 350, 360, and/or 365 may then be uploaded to one or more servers 130A-N and, execution of one or more of the instructions included therein may act to establish and/or manage one or more of virtual computer infrastructures 160. On some occasions, starting up one or more of sets of instructions 350, 360, and/or 365 on a server 130 may initiate an automatic configuration of the server 130.

Set of instructions 265 may include a usage statistics set of instructions 305. Execution of the usage statistics instructions 305 may, for example, enable management system 140 to collect and or monitor usage statistics for virtual computer infrastructure 160 and/or a server or component included therein. Exemplary usage statistics that may be gathered according to usage statistics instructions 305 include per user statistics, aggregated statistics for multiple users, statistics related to a specific account, and/or costs incurred by users of the virtual communication infrastructure. Execution of the usage statistics instructions 305 may also enable, for example, an administrator, such as administrator 115 and/or a user, such as users 105A-N and 106 to view and/or manipulate gathered usage statistics.

Execution of a provisioning set of instructions 310 may enable management system 150 to execute various provisioning activities within virtual computer infrastructure 160. Exemplary provisioning activities include the provisioning of virtual machines within virtual computer infrastructure 160 for the sales and delivery of data, software programs, and/or capacity.

Execution of a billing and usage metering set of instructions 315 may enable management system 150 to, for example, meter the usage of the virtual computer infrastructure, determine costs associated with usage of the virtual computer infrastructure, and/or prepare bills for users of the virtual computer infrastructure. Execution of billing and uses metering set of instructions may also enable management system 140 to handle invoices (e.g., debit/credit) and or automatically keep track of usage per user.

Execution of a status monitoring set of instructions 310 may enable management system 150 to, for example, monitor the status of, for example, the virtual computer infrastructure, components included within the virtual computer infrastructure, and/or communication links with the virtual computer infrastructure. For example, execution of status monitoring set of instructions 320 may enable a front-end user to gain full insight into components included within the virtual infrastructure. Execution of status monitoring set of instructions 320 may also enable a user and/or administrator to get an overview of hardware included within the virtual computer infrastructure and direct management of the components included within the virtual computer infrastructure.

Execution of management console set of instructions 325 by management system 150 may enable management system 150 to provide an interface, graphical or otherwise, to an administrator and/or user of the virtual computer infrastructure to facilitate the management of, for example, virtual computer infrastructure 160 and/or management system 150.

Execution of an order portal set of instructions 330 may enable management system 150 to provide graphical user interfaces to a user and/or administrator of virtual computer infrastructure 160. Some of these graphical user interfaces may be customizable and may enable an administrator and/or user to adjust the operation of virtual computer infrastructure 160 via, for example, one or more partners, resellers, or system integrators and/or to change, add components to, or remove components from virtual computer infrastructure 160. In some embodiments, management system and/or an entity owning or controlling server 130 may provide an interface via which a user may interact with and/or purchase communication or usage rights with one or more virtual computers 605*a-n*.

Execution of application programming interface (API) set instructions 335 may enable management system 150 to provide an interface file that an administrator and/or user may manage the virtual computing infrastructure using an, for example, an HTTP request.

Execution of a command queue set of instructions 340 may enable management system 150 and/or server 130 to execute and/or manage commands, instructions, and/or updates.

Figure 4:
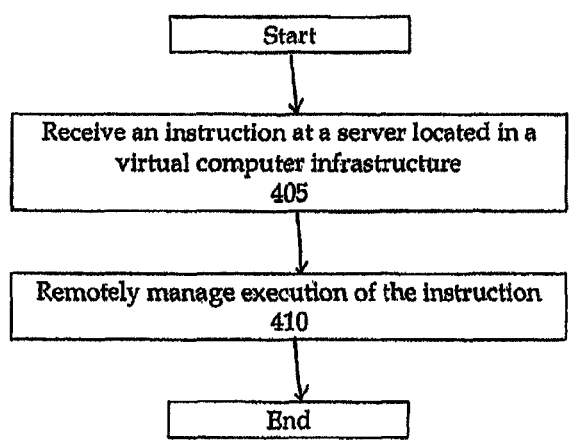
FIGS. 4 and 5 are flow charts depicting exemplary processes for establishing, setting-up, and maintaining a virtual computer infrastructure, in accordance with embodiments of the present invention.

FIG. 4 is a flowchart illustrating an exemplary process 400 for managing a virtual computer infrastructure. Process 400 may be executed by, for example, any of the systems and/or system components disclosed herein.

In step 405, an instruction may be received at one or more servers, such as servers 130A-N, located in a virtual computer infrastructure, such as virtual computer infrastructure 160. The instruction may be received from, for example, a user, such as user 105, and/or an administrator, such as administrator 115. Exemplary instructions include a request to access data, a request to execute a computer software programs, a request to start, stop, or modify operations of a virtual computer included in a virtual computer infrastructure, such as virtual and/or physical computer infrastructure 160, and a request to save data.

In step 410, execution of the instruction may be directly and/or indirectly managed by, for example, a management system remotely communicatively coupled to the virtual computer infrastructure, such as management system 150. Managing execution of the instruction may include, for example, maintaining the virtual computer infrastructure, load-balancing execution of the instruction between one or more servers within the virtual computer infrastructure, monitoring usage statistics for the virtual computer infrastructure, monitoring usage statistics for a user communicatively coupled to the virtual computer infrastructure, provisioning of the virtual computer infrastructure, monitoring costs associated with usage of the virtual computer infrastructure, monitoring a status of the virtual computer infrastructure, providing a management portal via which an administrator of the virtual computer infrastructure may interact with the management system, providing customizable templates and graphical user interfaces to the administrator via which the administrator may interact with the management system, updating components included in the virtual computer infrastructure, and/or providing an API wherein execution of the API by the administrator enables the administrator to manage the virtual computer infrastructure using, for example, a hypertext transfer protocol (HTTP) request. Following step 410, process 400 may end.

Figure 5:
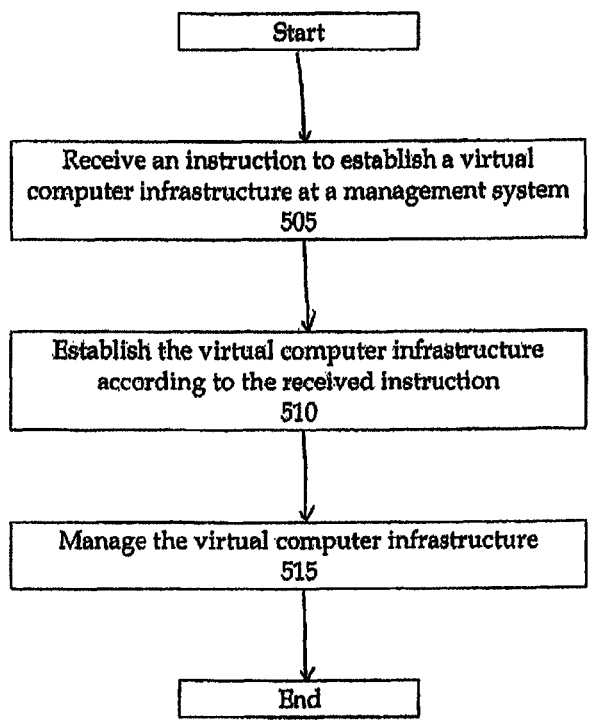

FIG. 5 is flowchart illustrating an exemplary process 500 for establishing and/or managing a virtual computer infrastructure, such as virtual computer infrastructure 160. Process 500 may be executed by, for example, any of the systems and/or system components disclosed herein.

In step 505, an instruction to set-up, establish, and/or maintain a virtual computer infrastructure including multiple servers may be received at, for example, a management system, such as management system 150. The instruction may be received from, for example, a user, such as user 105 and/or an administrator, such as administrator 115. In some embodiments, the instruction may be received via a user's interaction with one or more of a non-transitory computer-readable media, such as non-transitory computer-readable media 260, a set of instructions, such as set of instructions 265, and/or a graphical user interface provided by, for example, management system 150. On some occasions, the instruction may be received via a web browser.

In step 510, a virtual computer infrastructure, such as virtual computer infrastructure 160, any be established according to the received instruction. In some embodiments, step 510 may be executed by a remote management system communicatively coupled to the virtual computer infrastructure, such as management system 150. In some embodiments, establishing of the virtual computer infrastructure may be executed by the management system via a web browser.

Once established, the virtual computer infrastructure may be managed by, for example, the management system (step 515). In some embodiments, managing the virtual computer infrastructure may include managing communications between a user and the servers included in the virtual computer infrastructure and/or managing communications between the servers included in the virtual computer infrastructure. In some embodiments, managing the virtual computer infrastructure may be executed by the management system via a web browser.

Managing the virtual computer infrastructure may include, for example, monitoring usage statistics for the virtual computer infrastructure, monitoring usage statistics for a user communicatively coupled to the virtual computer infrastructure, provisioning of the virtual computer infrastructure, monitoring costs associated with usage of the virtual computer infrastructure, monitoring a status of the virtual computer infrastructure, providing a management portal via which the administrator may interact with the management system, providing customizable templates and graphical user interfaces to the administrator via which the administrator may interact with the management system, updating components included in the virtual computer infrastructure, providing an API wherein execution of the API by the administrator enables the administrator and/or a user to manage the virtual computer infrastructure using, for example, a hypertext transfer protocol (HTTP) request.

In some embodiments, managing the virtual computer infrastructure may include enabling a user and/or administrator to purchase access to content provided by one or more content providers, such as content providers A-N 140A-140N. Exemplary content for which access may be purchased includes date files, software programs including (but not limited to) operating systems, sets of instructions, such as set of instruction 265, third-party virtual computer infrastructure capacity, and publicly available cloud capability.

In other embodiments, managing the virtual computer infrastructure may include updating one or more the servers included in the virtual computer infrastructure with, for example, software and/or firmware updates.

In one embodiment, an administrator or operator of one or more servers to be included in a virtual computer infrastructure, such as virtual computer infrastructure 160, may establish an account with management system 150 and may establish and/or manage one or more virtual computer infrastructures. The administrator/operator may communicate with the management system via a website or via an API. The administrator/operator may download one or more sets of instructions, such as set of instructions 610, 620, and/or 630 from the website and then upload the sets of instructions to one or more servers to be included in the virtual computer infrastructure. Once the set of instructions are uploaded to a server, it may be remotely managed and/or updated automatically by the management system. In one embodiment, management system may act as a broker to facilitate the sale of capacity and/or software programs on one or more virtual computer infrastructures for use by one or more users, such as users 105A-N and 106.

Figure 6:
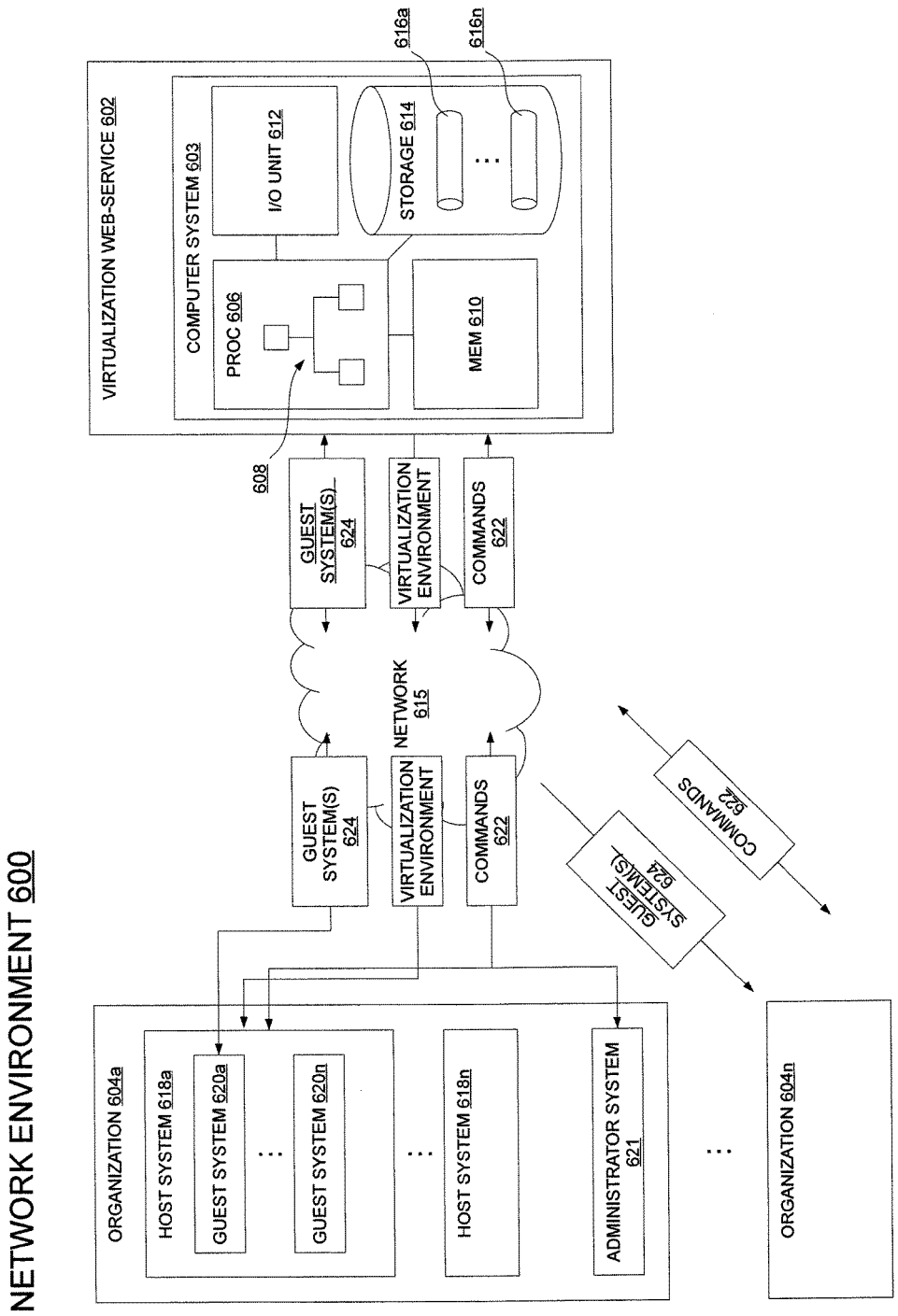
FIG. 6 is a block diagram of an illustrative network environment in which a virtualization distribution and management web-service may be utilized to serve virtual guest systems to host servers within organizations.

FIG. 6 is a block diagram of an illustrative network environment 600 in which a virtualization distribution and management web-service 602 (in short, "virtualization web-service 602") may be utilized to serve guest systems to host systems within organizations 604a-604n(collectively 604). The virtualization web-service 602 may be a computing system 603, such as a server, that includes a processing unit 606, which may be one or more computer processors, that executes software 608. The software 608 may include software modules that, which executed by the processing unit 606, perform functionality in accordance with the principles of the present invention. The functionality may include storing, delivering, and remotely managing guest systems and remotely deploying and maintaining host system 618a-618n (collectively 618) for the organizations 604, as further described herein. Although not shown, it should be understood that other organizations, such as organization 604n, may operate host system(s) and host system administrator systems 621, such as those shown in organization 604a, as well.

The processing unit 606 may be in communication with a memory 610, input/output (I/O) unit 612, and storage unit 614. The memory 620 may be configured to store data used by and/or software executed by the processing unit 606. The I/O unit 612 may be configured to communicate commands and/or data (e.g., guest systems and virtualization environments) via a network 615, such as the Internet. The storage unit 614 may be configured to store one or more data repositories 616a-616a (collectively 616). The data repositories 616 may be configured to store a variety of different data, such as one or more different standard configurations of available guest systems. As another example, the data repositories 616 may store customized guest systems after a user or organization 604a, for example, has customized a standard guest system for use in the organization 604a. Data repositories 616 may also be used to store complete or partial (incremental) backups of guest systems 620.

As shown, the organization 604a may utilize host systems 618. The host systems 618 are physical computers on which virtual guest systems may be operated. As an example, host system 618a is executing guest systems 620a-620n (collectively 620). The guest systems 620 may be standard guest systems available from the virtualization web-service 602. In being standard, a guest system may be a guest system that is readily available to customers of the virtualization web-service 602. Alternatively, the guest systems 620 may be customized guest systems or be a customized version of a standard guest system. A customized guest system or customized version of a standard guest system may be a standard guest system that is altered based on parameters that may be set by a service provider operating the virtualization web-service 602 or by the organization 604a, for example. In one embodiment, the guest system 620 may be identical guest systems (e.g., running identical operating systems with identical virtual machine configurations) or different guest systems (e.g., running different operating systems or with different virtual machine configurations).

In addition to the host systems 618, the organization 604a may also operate an administration system 621. The administrator system 621 may provide a user with the ability to interface with the computing system 603 of the virtualization web-service 602 to control and manage the host system 618a and guest systems 620 thereon. It should be understood that communicating with the virtualization web-service 602 inherently means to communicate with the computing system 603 of the web-service 602. In one embodiment, the administrator system 621 is a computing or communication system, such as a desktop, laptop, web browser, smart phone, tablet, or any other system that is capable of interfacing with a user interface, such as a graphical user interface, that provides for communication with the virtualization web-service 602. Because the host system 618a is typically a "blank slate" when configured with the guest systems 620, the host system 618a may be booted using a boot key (not shown), as further described herein. The administrator system 621 may be used to control operations of selecting and deploying the guest system 620 onto the host system 618a. In one embodiment, and as further described herein, a boot key (not shown) that is plugged into the host system 618a may be utilized to cause the host system 618a to communicate with the virtualization web-service 602. From there, the administrator system 621 may be utilized to communicate with the virtualization web-service 602 to cause the guest systems 620 to be downloaded and deployed on the host system 618a.

More specifically, one or more commands 622 may be communicated via network 615 by the administrator system 621 to the virtualization web-service 602. In response to the commands 622 via a graphical user interface (e.g., website) or otherwise, the processing unit 606 may access the data repositories 616 and download one or more selected guest systems 624 onto the host system 618a. The administrator system 621 may provide the user with the ability to configure the guest system(s) 624 as guest system(s) 620, as desired. The administrator system 621 may also provide the user with the ability to monitor and manage guest systems 620 and host systems 618a.

The data repositories 616 may further be configured to store information associated with each of the organizations, such as name, addresses, server addresses, boot key IDs, guest system information (e.g., date downloaded, current version, current configuration, etc.), contact information, user names, and so forth. Because the virtualization web-service 602 may be configured to support multiple, unrelated organizations 604, the software 608 may be configured to manage the data repositories in a partitioned manner to segregate information of each of the organizations.

Figure 7A:
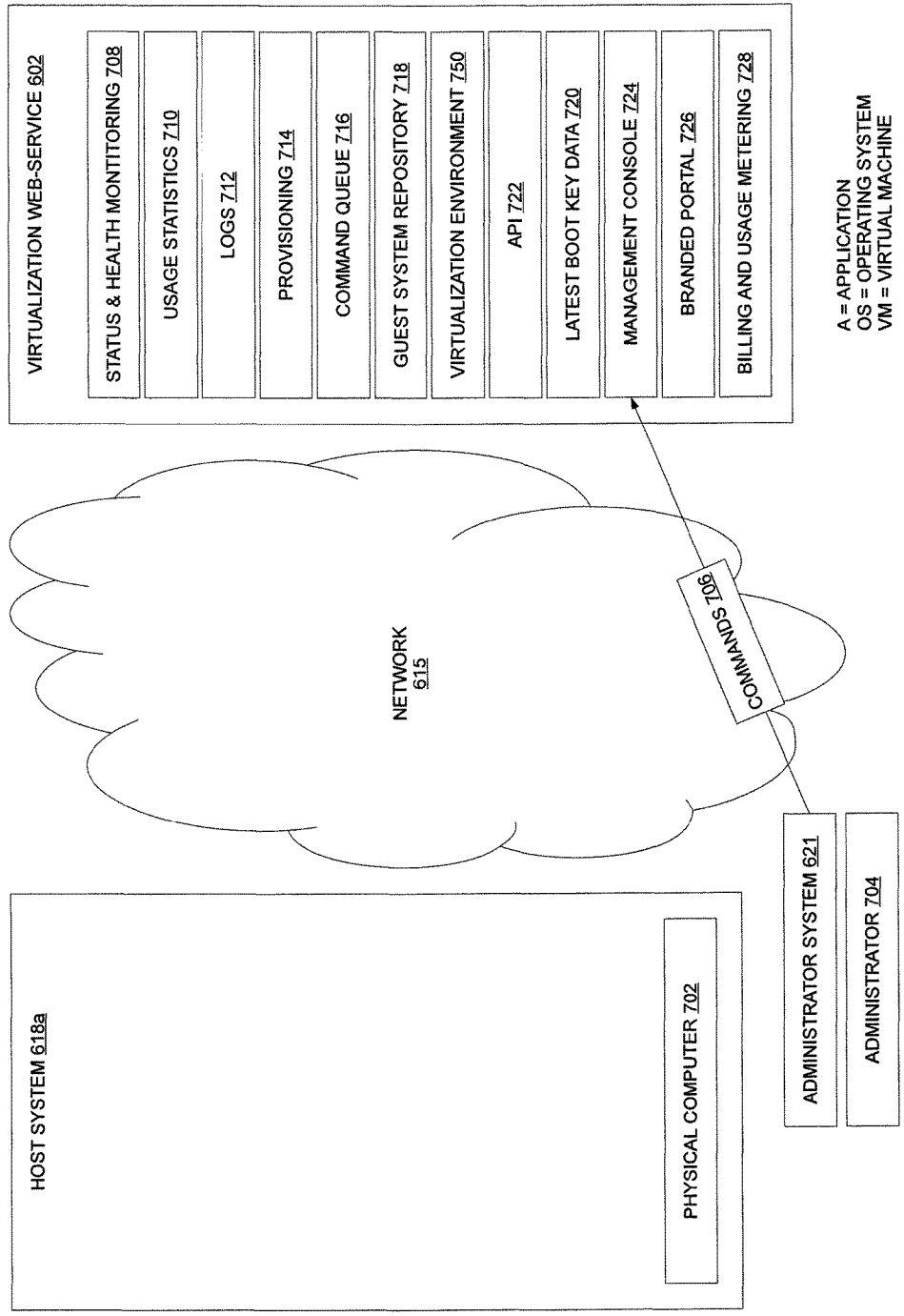
FIG. 7A is a block diagram of an illustrative first network environment configuration for performing the illustrative virtualization setup process.
Figure 7B:
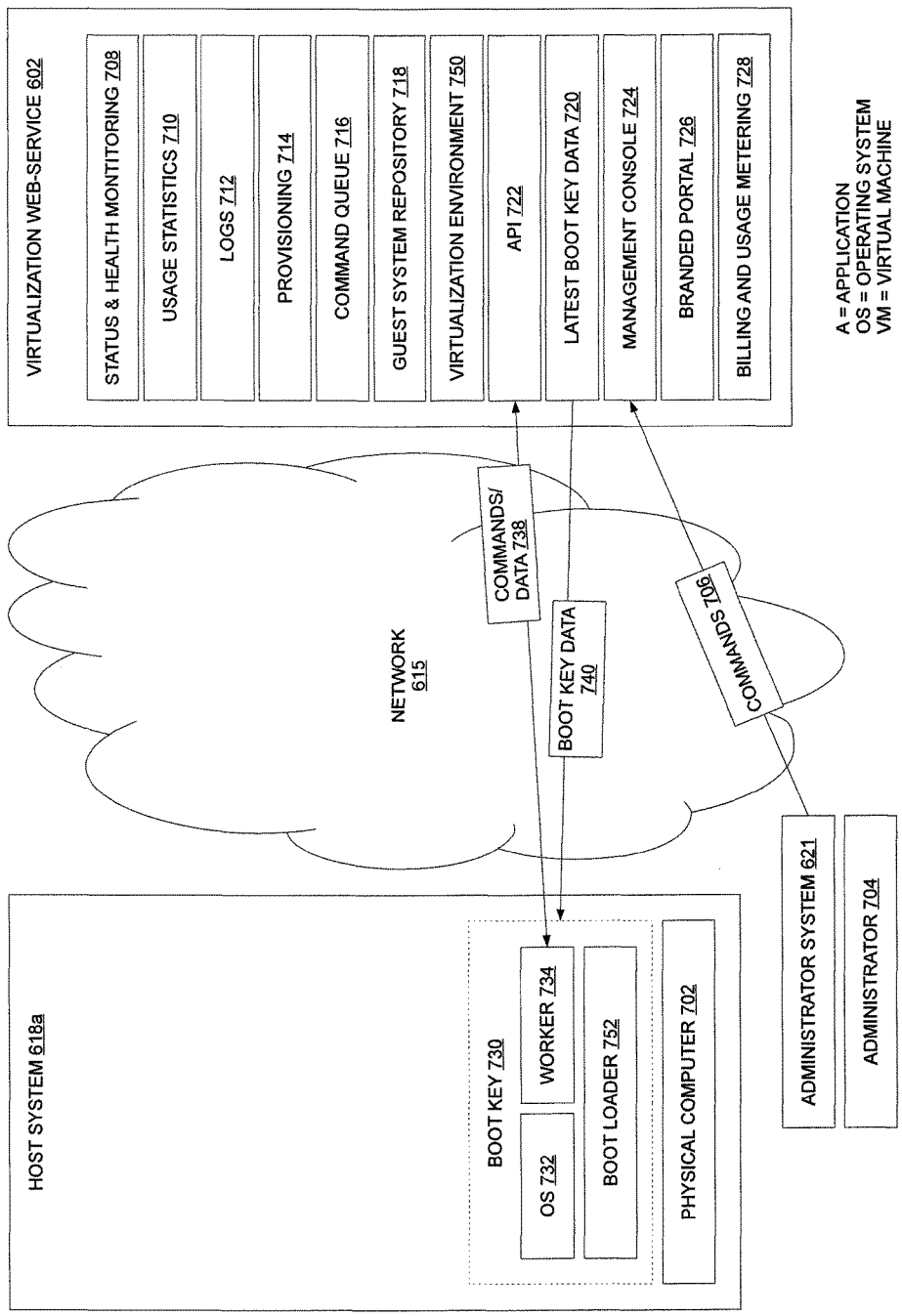
FIG. 7B is a block diagram that shows an illustrative second network environment configuration for performing the illustrative virtualization setup process.
Figure 7C:
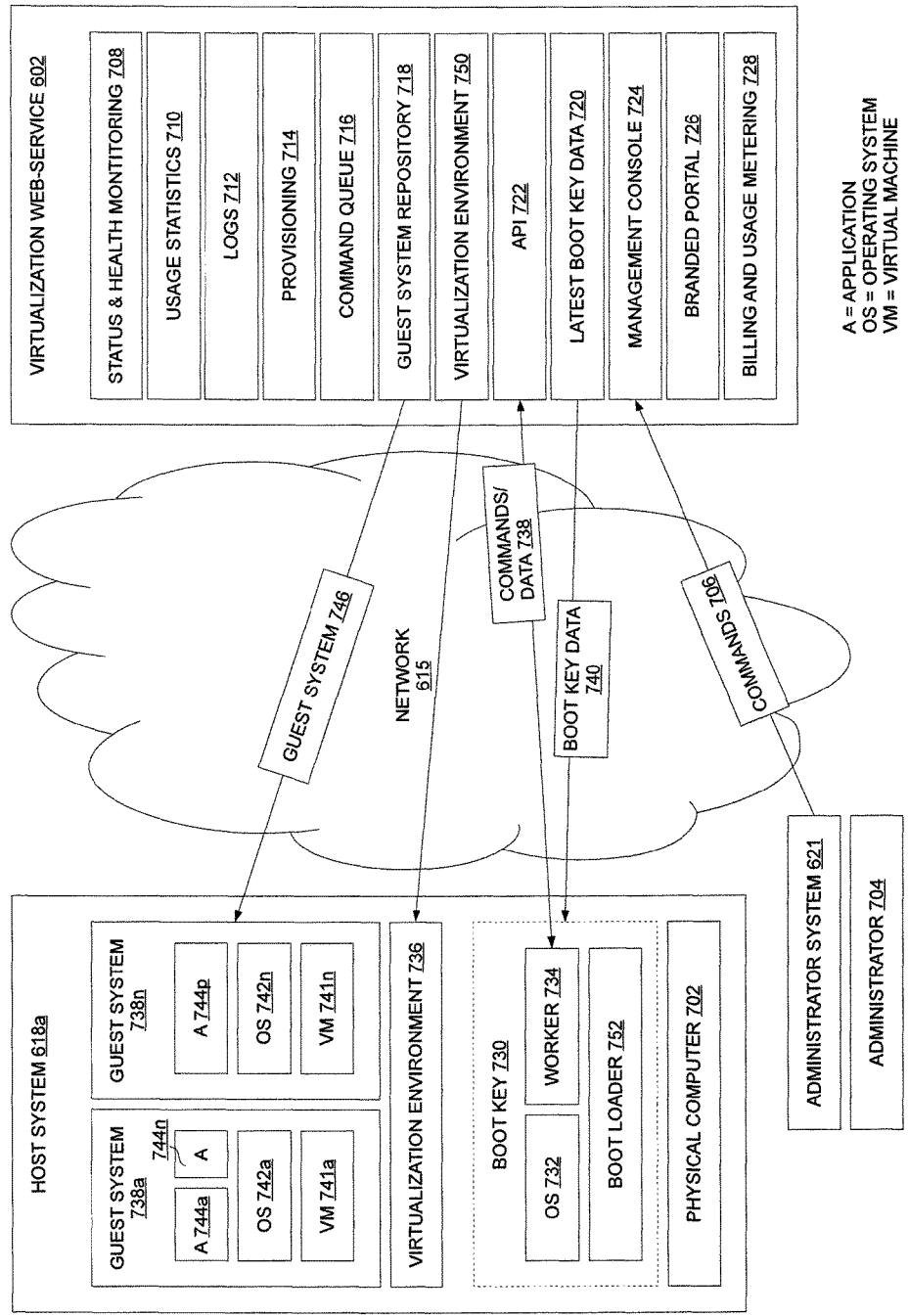
FIG. 7C is a block diagram of an illustrative third network environment configuration for performing the illustrative virtualization setup process.

FIGS. 7A-7C are a sequence of illustrations showing an illustrative hardware virtualization setup process. FIG. 7A is a block diagram of an illustrative first network environment configuration 700a for performing the illustrative hardware virtualization setup process. As shown, the network environment 700 includes the host system 618a, virtualization web-service 602 and administrator system 621, as provided in FIG. 6. In the setup process shown in FIG. 7A, the host system 618a may be a physical computer 702 without having an operating system (OS) or applications installed thereon. By using such a "blank slate" host system 618a, the cost of operating the host system 618a may be reduced from having an operating system and other installed software.

As further shown in FIG. 7A, an administrator 704 operating the administrator system 621 may communicate commands 706 with the virtualization web-service 602. The virtualization web-service 602 is shown to include a number of different functions, including status and health monitoring 708, usage statistics 710, logs 712, provisioning 714, command queue 716, guest system repository 718, latest book key 720, API 722, management console 724, branded portal 726, billing and usage metering 728, and virtualization environment 750. The commands 706 may be communicated to the management console 724, which may be configured to enable the administrator 704 to manage an account, including guest systems, that may selectively deploy onto the host system 618a via the network 615, such as the Internet.

In one embodiment, management console 724 may be configured to enable administrator 704 to download the latest boot key data 720 to administrator system 621, where the administrator system 621 may write the latest boot key data 720 to a bootable machine-readable media, such as a CD-ROM or USB memory, to create a boot key 730 capable of automatically configuring the host system 618a to operate and communicate with virtualization web-service 602, as further described in the following paragraph. It should be understood that boot key 730 may be configured once to start a configure multiple host systems 618 for operation and virtualization with no installation process or other interaction from the administrator 704.

FIG. 7B is a block diagram that shows an illustrative second network environment configuration 700b for performing the illustrative virtualization setup process. At this step, a boot key 730 may be connected to the physical computer 702. In one embodiment, the boot key 730 may include a connector port and may be connected to a computer port, such as a USB connector, or inserted into device, such as DC-ROM or DVD-ROM reader. In one embodiment, the boot key 730 may include a wireless port to communicate with a computer via a wireless connection. In an alternative embodiment, the boot key 730 may be integrated into the physical computer 702, such as being part of a basic input output system (BIOS). The boot key 730 may be a device that includes hardware (e.g., semiconductor chips) and software or firmware that includes a boot loader 752 capable of loading an operating system and an operating system 732 capable of causing the host system 618a to operate during turn-on (e.g., power-up or reboot) of the computer. The operating system 732 may be a partial operating system in that is may be configured to support a subset of operating capabilities of the computing system. For example, the operating system 732 may have sufficient capabilities to support communications, downloading and storage of executable data, such as a virtual machine, execution of the executable data, and other functionality to enable a web-service to manage operations on the physical computer 702. In the case of the computing system being a specialized device, such as a smart phone, the partial operating system may provide for a subset of operating and communications functions without providing for other available operations that may be created with installation of a full operating system.

The boot key 730 may further store a worker 734 that executes in conjunction with the operating system 732. The worker 734 may be configured to automatically communicate with the API 722 on the virtualization web-service 602 by having a logical address of the virtualization web-service 602 with which to communicate. The worker 734 may communicate commands and data 738 with the API 722 to initiate and drive the virtualization setup process with the virtualization web-service 602. The API 722 may communicate with the latest boot key data 720 to determine if the boot key 730 is the latest version, and, if not, cause the latest boot key data 740 to be communicated to the worker 734 for updating the boot key 730. The virtualization setup process is further described with regard to FIG. 8.

FIG. 7C is a block diagram of an illustrative third network environment configuration 700c for performing the illustrative hardware virtualization setup process. Worker 734 may further download and activate virtualization environment 750, which may include hypervisor and supporting tools, to virtualization environment 736 to make host system 618a capable of operating virtual machines.

In this configuration 700c, the host system 618a is shown to be configured with a virtualization environment 736 and multiple guest systems or machines or servers 738a-738n (collectively 738). It should be understood, however, that the host system 618a may be configured with only a single guest system. The guest systems 738 may be configured with virtual machines (virtual hardware) 714a-741n (collectively 741), operating systems 742a-742n (collectively 742), and one or more applications ("A") 744a-744n and 744p, respectively. In one embodiment, the virtual machines 741 are identical. Alternatively, the virtual machines 741 may be different or be configured differently. In one embodiment, the operating systems 742 may be the same. Alternatively, the operating systems 742 may be different or be configured differently. As shown, the guest system repository 718, which may store a variety of pre-configured guest systems, may be accessed by the administrator 704 utilizing the administrator system 621 to cause a virtual machine 746 (i.e., data representative of a virtual machine) to be communicated from the virtualization web-service 602 to the host system 618a via the network 615. Virtualization web-service 602 may prior to communicating a requested guest system 738, configure host system 618a with a virtualization environment 736 to make host system 618a capable of operating virtual machines 741. A virtualization environment 736 may be shared among multiple virtual machines 741.

The boot key 730 is shown to be maintained in communication with host system 618a. However, it should be understood that the boot key 730 or contents stored thereon (e.g., operating system 732, worker 734, and boot loader 752) may be installed onto the host system 618a, thereby enabling the host system 618a to operate independently from the boot key 730 after the initial setup.

It should be understood that the principles of the present invention may be performed on any electronic device capable of having a boot key be utilized for causing the electronic device, such as a smart phone, to communicate with a web-service, thereby allowing the electronic device be shipped from a manufacturer with little or no capabilities of its own as shipped (i.e., a "blank" electronic device). By shipping the device as a "blank" and allowing the software (e.g., operating system, applications, etc.) to be installed by a web-service, manufacturer or third-party, as instructed by a boot key, the cost of manufacturing can be significantly reduced for the manufacturer.

The boot key may include a unique identifier (ID) or boot key ID. The unique ID may identify a host system and/or organization. Still yet, the unique ID may identify a user.

Alternatively, the unique ID may be associated with a host system, organization, and/or individual in a data repository (e.g., database) at the web-service. The host system, as directed by the worker of the boot key, may communicate the unique ID to identify the host system. The web-service may utilize the unique ID to identify which organization the unique ID belongs. In one embodiment, the unique ID is communicated to the web-service with every communication, thereby enabling the web-service to track each communication by a host system. In an alternative embodiment, certain communications may include the unique ID, such as initial startup of a host server.

FIG. 8 is a diagram of an illustrative setup or startup process 800 in accordance with the principles of the present invention. The process 800 starts at step 802, where the physical computer of host system 618a is started by a user turning on the computer. Because the host system 618a may be a "bare metal" server (i.e., not containing any software), the host system 618a polls for a boot key 804. The boot key may store a boot loader, operating system kernel, and worker. The boot key 7730, in response to being polled, starts a boot loader at step 806. Thereafter, the boot key 730 may start an operating system kernel at step 808. The operating kernel may be one of a variety of different operating kernels, but be one that is capable of being executed by the host system 618. At step 810, a copy of the boot key data may be made to memory and/or secondary storage device by the host system 618.

Figure 9:
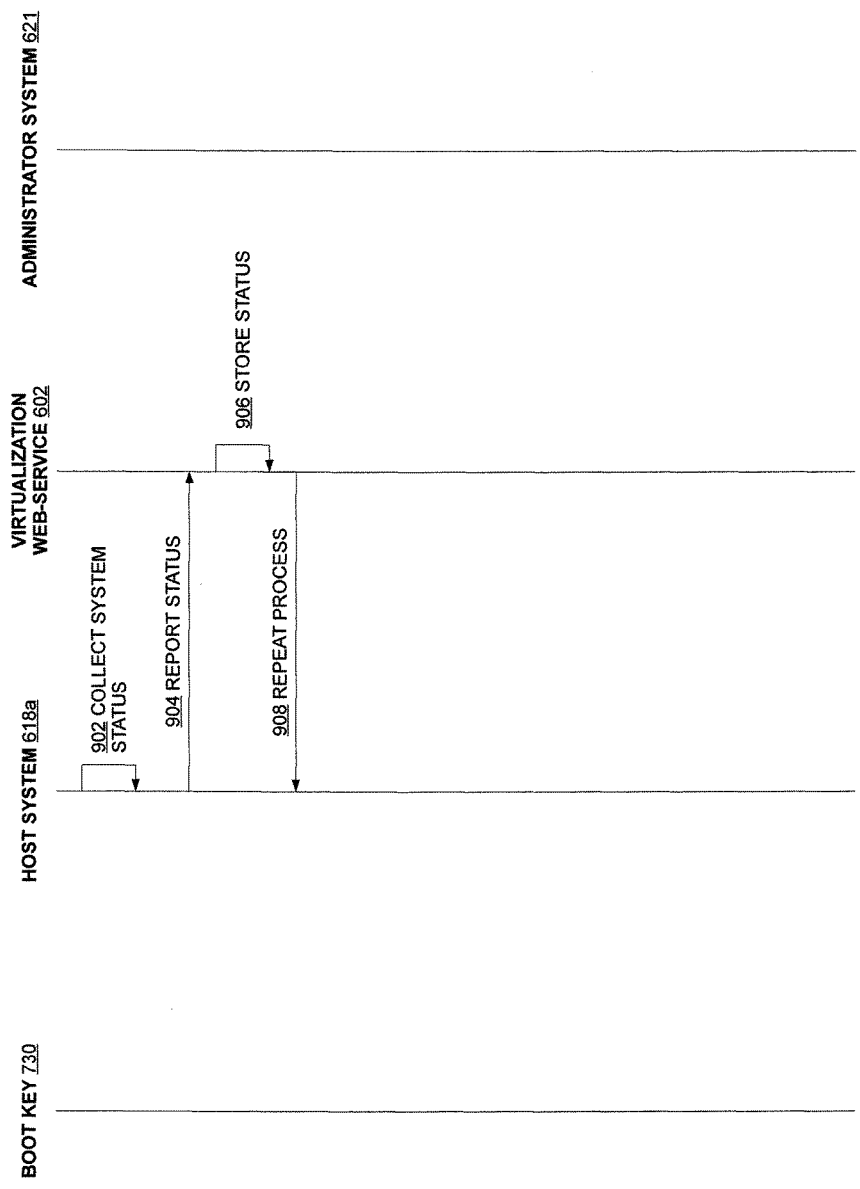
FIG. 9 is a diagram of an illustrative report process for the host server to have virtual server(s) updated in accordance with the principles of the present invention.
Figure 10:
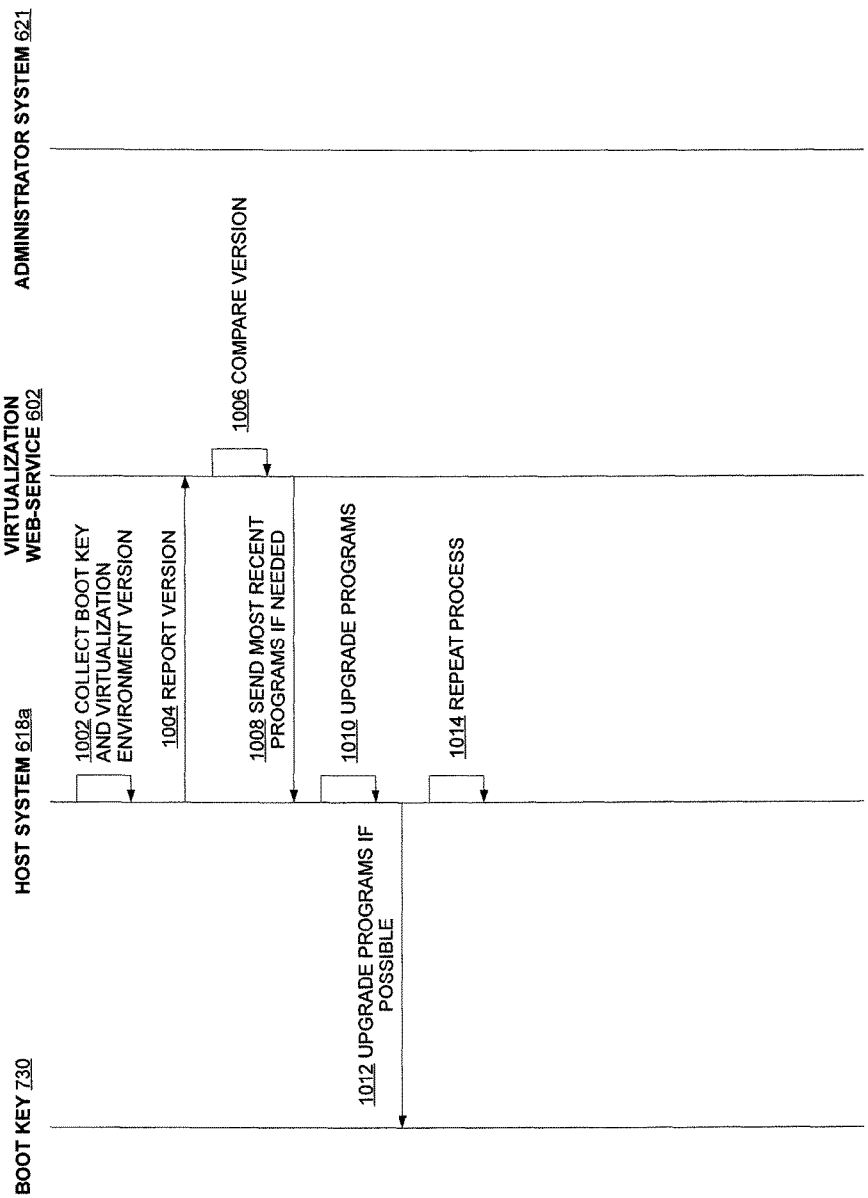
FIG. 10 is a diagram of an illustrative process that may be utilized in upgrading or updating programs of a boot key operating on a host server.
Figure 11:
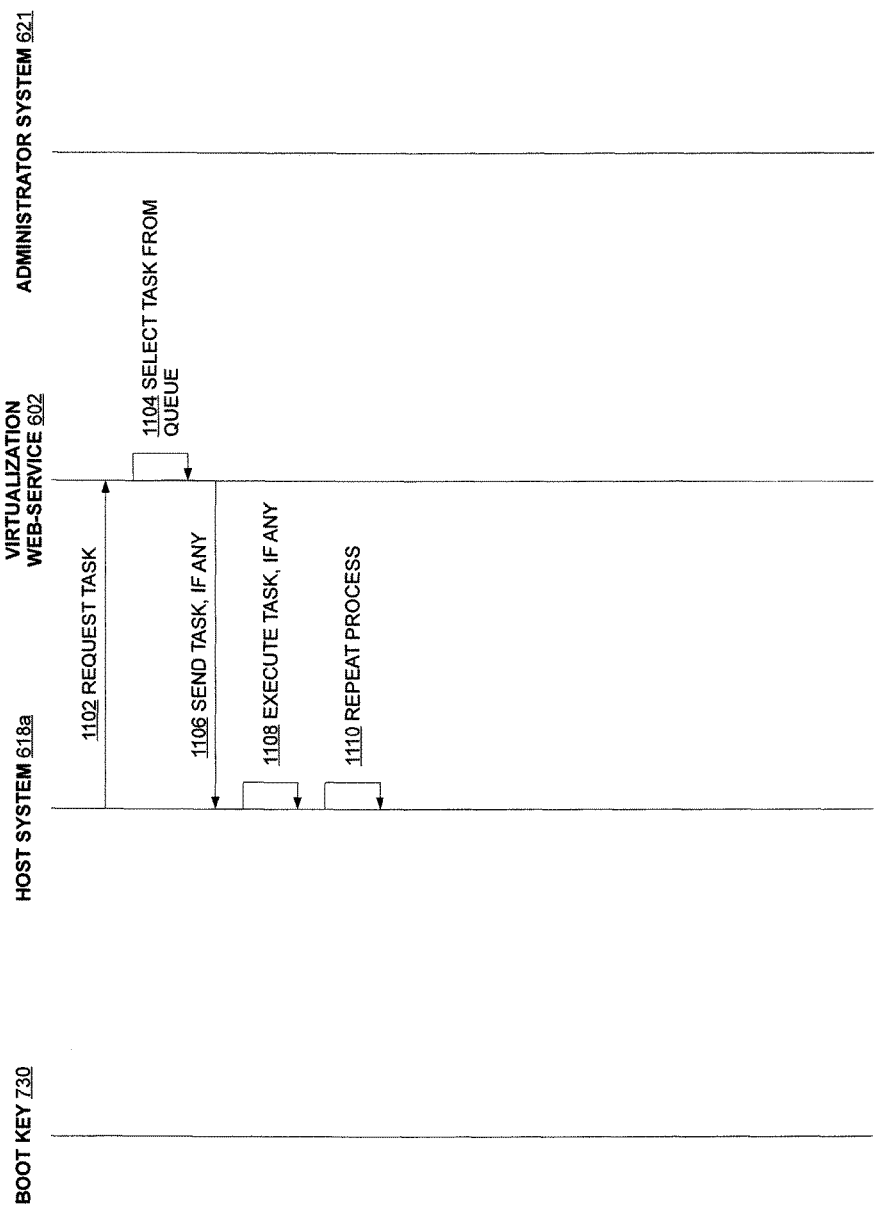
FIG. 11 is a diagram of an illustrative queue process for performing tasks in the virtualized environment in accordance with the principles of the present invention.

At step 812, a worker 812 may be executed by the host system 618a. At step 814, host system 618a may read network settings imprinted in the boot key code to determine if a static network configuration or a dynamic host configuration protocol (DHCP) should be utilized to enable networking. At step 816, if a static network configuration is determined, the process waits for the temporary boot IP number to be available on the network. At step 818, networking of the host system 618a may be enabled and configured. At step 820, the upgrade process, as described in FIG. 10, is executed to verify that the boot key data (programs) are the latest version. After the upgrade process is run once, the upgrade process may be started as a separate process to keep the software environment on host system 618a up-to-date. Step 822 is executed if the network is configured for static configuration and, if so, a new permanent IP number is requested from virtualization web-service 602. Step 824 is executed if the network is configured for static configuration virtualization web-service 602 sends an available IP number to host system 618a. Step 826 is executed if the network is configured for static configuration and, if so, on host system 618a, the temporary boot IP is replaced with the new IP number. At step 828, the report process, as described in FIG. 9, is started as a separate process. At step 830, the queue process, as described in FIG. 11, is started as a separate process.

FIG. 9 is a diagram of an illustrative report process 900 for virtualization web-service 602 to have status information from host system 618a and from guest system(s) residing on host system 618a, and to store that status information in accordance with the principles of the present invention. The update process 900 starts at step 902, where system status information is collected from host system 618a and, if any, the guest systems. The system status information may include current versions of guest system(s) operating on the host system 618a, current versions of supporting software operating on the host system 618a, operating status, performance or resource consumption. At step 904, the system status may be reported to the virtualization web-service 602.

In reporting the system status, status of one or more guest system(s) and the status of host system 618a may be communicated to the virtualization web-service 602. At step 906, the virtualization web-service 602 may store the reported status in a data repository in association with data records of an organization or customer and/or in association with data records of the host system 618a. It should be understood that the process may be event driven or sequential (based on polling).

FIG. 10 is a diagram of an illustrative process 1000 that may be utilized in upgrading or updating programs of a boot key 730 and virtualization environment 736 operating on a host system 618a. The process 1000 starts at step 1002, where a boot key version and a virtualization environment version is collected. The versions may be reported at step 1004 from the host system 618a to the virtualization web-service 602, where the virtualization system may be provided by a third-party service provider that supports multiple, unrelated organizations via a network, such as the Internet. At step 1006, the versions may be compared. In comparing the versions, the virtualization web-service 602 may compare the version of the boot key and virtualization environment received from the host system 618a to the most recent version of the boot key and virtualization environment stored by the virtualization web-service 602. At step 1008, the most recent versions of one or more programs may be communicated from the virtualization web-service 602 to the host system 618a. The programs may include an operating system, worker, hypervisor, or other software program utilized by the host key and/or host system 618a to configure, deploy, manage and maintain guest systems and to manage and maintain the host system. At step 1010, the program(s) may be upgraded by the host system 618a. At step 1012, the host system 618a may upgrade the programs on the boot key 730, if possible. In some cases, the boot key 730 may have rewritable memory that may enable the programs to be upgraded. Alternatively, the boot key 730 may be configured in a manner where the programs may not be upgraded, such as a read only compact disc (CD-ROM). At step 1014, the process may be repeated. It should be understood that the process may be event driven or sequential (based on polling).

FIG. 11 is a diagram of an illustrative queue process 1100 for performing tasks in the host system 618a and the virtualized environment in accordance with the principles of the present invention. The process 110 starts at step 1102, where a task may be requested from the virtualization web-service 602 by the host system 618a. At step 1104, the virtualization web-service 602 may select a task from the task queue. The task may be selected based on task registration time, priority label and other criteria. The task may be any task that the host system 618a is capable of performing, as described herein. For example, the task may downloading and deploying a guest system, upgrading a guest system, modifying a virtual machine, downloading a new application for one or more guest systems, and so forth. It should be understood that the virtualization web-service 602 may be configured to check the queue for tasks requested by more than one host system of more that one organization. It should also be understood that multiple instances of queue process 1100 may be established in parallel.

At step 1106, the task selected by virtualization web-service 602 may be communicated to the host system 618a. The communicated task may be a set of commands or binary data (e.g., application). At step 1108, the task received from the virtualization web-service 602 may be executed on the host system 618a. At step 1110, the process may be repeated.

It should be understood that the process may be event driven or sequential (based on polling). In terms of being event driven, the boot key (e.g., worker) may cause a request to be communicated to the virtualization web-service 602 to request that pending command(s) for the host server with which the boot key is communicating be executed. Because the host server may have little or no virtualization management capabilities as the virtualization web-service 602 may be configured to handle the management of the virtual machines on the host server.

Figure 12:
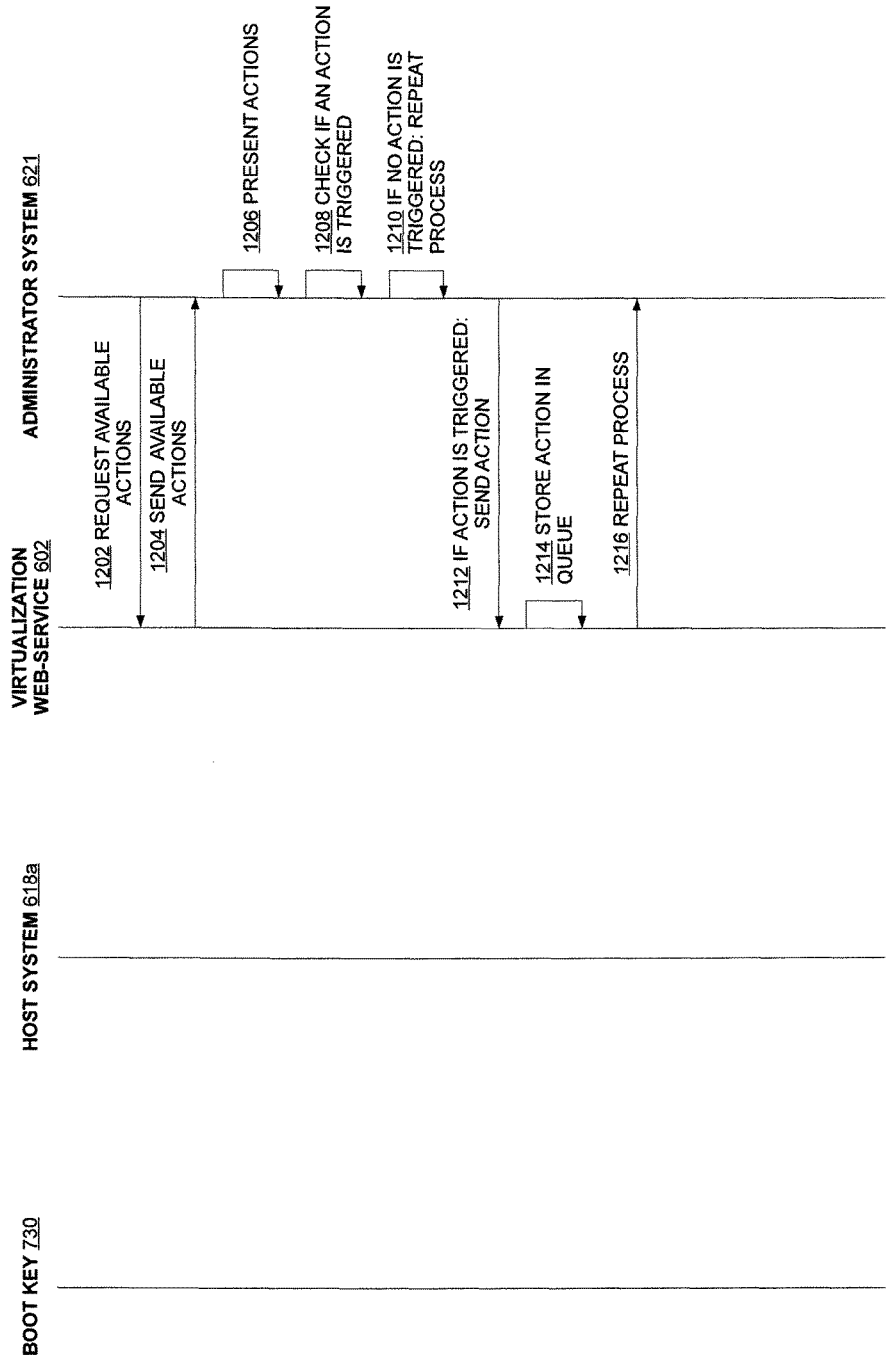
FIG. 12 is a diagram of an illustrative action process for enabling a user to perform actions in managing or controlling virtual servers.

FIG. 12 is a diagram of an illustrative action process 1200 for enabling a user to perform actions in managing or controlling guest systems and host system 618a, including, but not limited to, the boot key and the virtualization environment contained on host system 618a. The process 1200 starts at step 1202, where an administrator system 621, such as a desktop computer, requests available actions from the virtualization web-service 602. The available actions may be a wide variety, including selecting one or more guest system, downloading the selected guest system(s), configuring or reconfiguring a guest system already installed on the host system 618a, and so on. At step 1204, available actions may be sent from the virtualization web-service 602 to the administrator system 621. At step 1206, the available actions may be presented on the administrator system 621 to the user. In presenting the available actions, the actions may be presented on a graphical user interface, such as a webpage, web app (web application) or smart phone application (mobile app). It should be understood that the process may be event driven or sequential (based on polling).

At step 1208, a check if an action is triggered may be made. The check may be active or passive, such as being responsive to a selection of an action by a user. At step 1210, if no action is triggered the process 1200 may repeat. At step 1212, in response to an action being selected, the administrator system 621 may communicate the action to the virtualization web-service 602. At step 1214, the action may be stored in a task queue on virtualization web-service 602, which may be executed by the virtualization web-service 602 in due course, as describer in FIG. 11. At step 1216, the process 1200 repeats.

FIG. 13 is a diagram of an illustrative status process 1300 that provides for the administrator system 621 to provide a user with status of the guest systems and host systems via the host system 618a, including the virtualized environment and any guest systems, the boot key and the virtualization web-service 602. The collection of status information from host system 618a to virtualization web-service 602 is described in FIG. 9. The process 1300 may start at step 1302, where the administrator system 621 sends a status request to the virtualization web-service 602. At step 1304, the virtualization web-service 602 responds to the status request with a status update being communicated to the administrator system 621. At step 1306, the administrator system 621 may present the status of all systems to the user via, for example a graphical user interface (GUI). At step 1308, the process may repeat. Although not shown it should be understood that, in some embodiments the process 1300 may be an event driven process, where the virtualization web-service 60 send events as they occur to the administrator system 621, as an alternative to the shown sequential process, where the administrator system 621 is polling the virtualization web-service 602 for status updates with intervals. It should also be understood that the virtualization web-service 602 may be configured to send status updates to more than one administrator system 621 of more than one organization, and that multiple processes 1300 may run in parallel.

FIGS. 14A-14B are diagrams of an illustrative launch guest system process 1400 to enable a user to launch a guest system on the host system 618a. It should be understood that the host system 618a may or may not have a virtualization environment. The process may start at step 1402, where a user of the administrator system 621 may request a list of guest systems that are available from the virtualization web-service 602. At step 1404, the list of available guest systems may be sent to the administrator system 621. At step 1406, the list of available guest systems may be presented to the user. The presentation may be made via a GUI, API or otherwise. At step 1408, the user may select a guest system and virtual machine configuration for that guest system. At step 1410, the user may selectively trigger a launch of the guest system.

At step 1412, in response to the user selectively triggering to launch the guest system, a command may be communicated to the virtualization web-service 602. At step 1414, in response to receiving the command, the virtualization web-service 602 may save the command in a queue. At step 1416, the host system 618a may check the virtualization web-service 602. If the command in the queue is directed for the host system 618a, as opposed to another host system, then the virtualization web-service 602 may communicate a queue item, in this case, a task to launch a guest system.

FIG. 14B At step 1420, host server 618a check if a virtualization environment is operating on host server 618a. If not, step 1422 is executed and a virtualization environment is requested, which may include hypervisor, supporting tools and configuration data to enable the host system 618a to operate virtual machines. At step 1424 the virtualization web-service 602 configures the virtualization environment and appropriate tools on host system 618a.

At step 1426, the host system 618a may send a request to the virtualization web-service 602 to have the guest system communicated to the host system 618a. At step 1428, the virtualization web-service 602 may communicate the requested guest system to the host system 618a. At step 1430, the host system 618a may start the guest system to execute. Once executing, the guest system may perform conventional guest system operations. It should be understood that the process may be event driven or sequential (based on polling).

Figure 15:
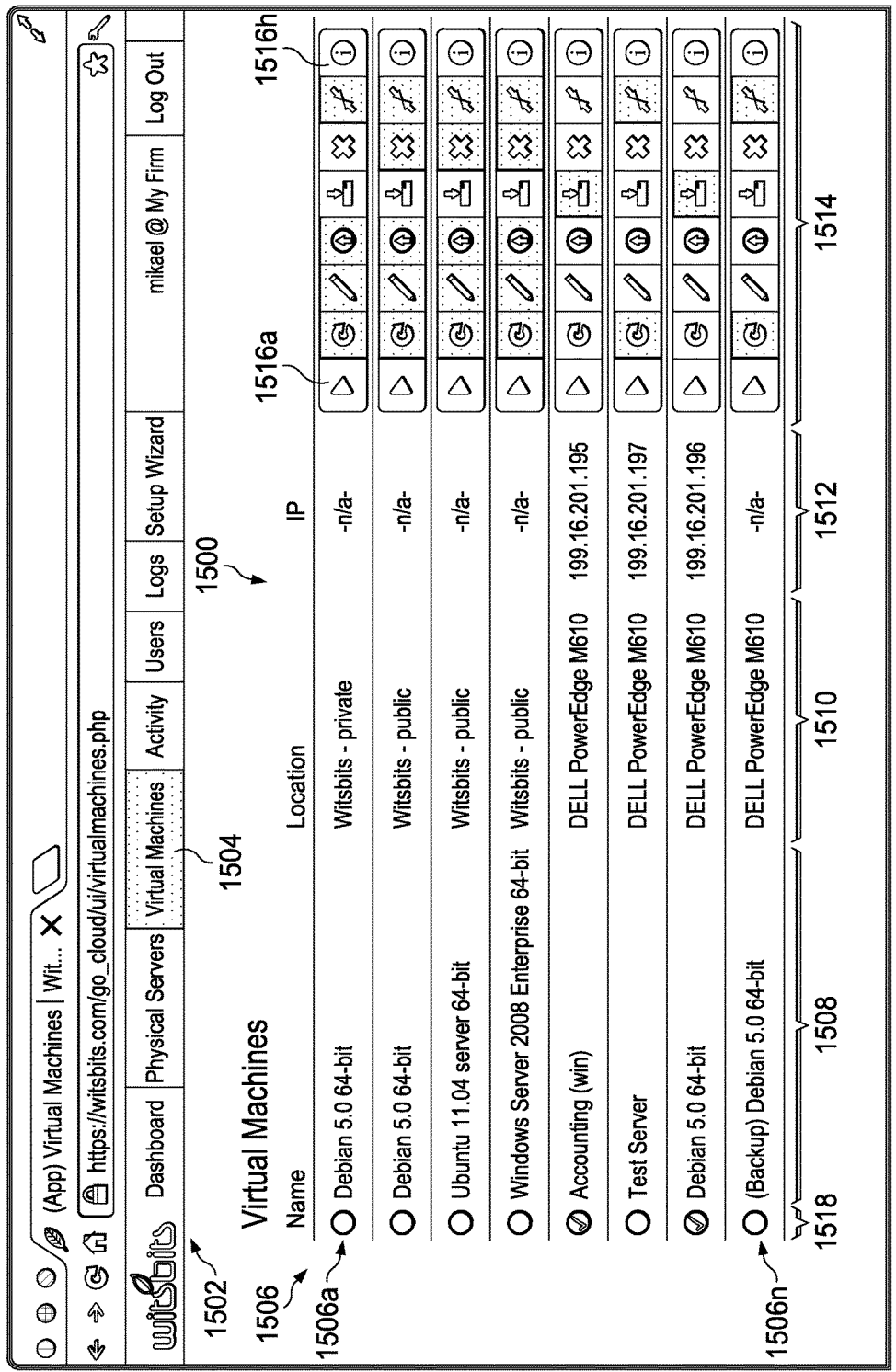
FIG. 15 is a screen shot of an illustrative GUI for monitoring and managing virtual machines operating on a host computer.

FIG. 15 is a screen shot of an illustrative GUI 1500 for monitoring and managing virtual machines or guest systems operating on a host computer. The GUI 1500 may include a number of different views that may assist the user in monitoring and controlling operations of host systems and guest systems being executed thereon. One of the selectable views is a virtual machines view that may be selected y a user clicking on a soft-button 1504. As shown in the virtual machines view, a listing of virtual machine data records 1506, including data records 1506a-1506n (collectively 1506), is shown. Each of the data records 1506 include a name parameter 1508, location parameter 1510, IP address parameter 1512, and a set of actions parameters 1514. In addition, a status indicator 1518 is included with each of the data records 1506.

The name parameter 106 may include a name of a virtual machine or server that a user selects or that the system automatically assigns. The location parameter 1510 may list physical location of physical computers on which the virtual machines are located. In one embodiment, the location parameter 1510 may indicate whether the host system or the guest system is public (accessible by any customer of the virtual machine service provider) or private (accessible only to a particular customer). The IP address parameter 1512 may list actual IP addresses of the physical computers and guest systems or list that the IP address is not available (n/a) due to the server being off-line, unavailable to the user, or otherwise.

The set of actions parameters 1514 may include a number of selectable actions via selectable icons 1516a-1516h (collectively 1516), as shown. The selectable icons 1516a may include play (arrow)/stop (square) selectable icons that causes the associated virtual machine to download from the remote virtualization system to the host system, if not already downloaded, and played. If the stop icon is displayed, then the user knows that the virtual machine is operating and that selecting the stop icon will cause the virtual machine to stop on the host system. A reboot selectable icon 1516b may enable a user to instruct the host system to reboot the associated virtual machine. A rename selectable icon 1516c may enable the user to instruct the host system or virtualization system to rename the virtual machine. A backup selectable icon 1516d may enable the user to instruct the host system to transfer a snapshot (copy) of the guest system to the virtualization system for backup purposes.

Continuing with the selectable icons 1516, a download selectable icon 1516e may enable the user to cause the virtual machine to be downloaded to the administration system (e.g., laptop) to allow the user to view the virtual machine off-line or otherwise. The download may be from the host system or virtualization system depending on the location of the virtual machine. A delete selectable icon 1516f may enable the user to instruct the host system or virtualization system to delete an associated guest system. A login information selectable icon 1516g may enable the user to view 1516h may enable a user to instruct the host system or virtualization system to display statistics and status of the associated guest system.

It should be understood that the GUI 1500 is illustrative and that a variety of different GUI elements may be utilized to provide for the same or analogous functions shown in the GUI 1500. For example, rather than having a download selectable icon 1516e, the GUI 1500 may show icon(s) of virtual machines and icon(s) of physical computers, thereby allowing a user to drag an icon of a virtual machine onto an icon of a physical computer to copy or move the virtual machine onto a physical computer.

Figure 16:
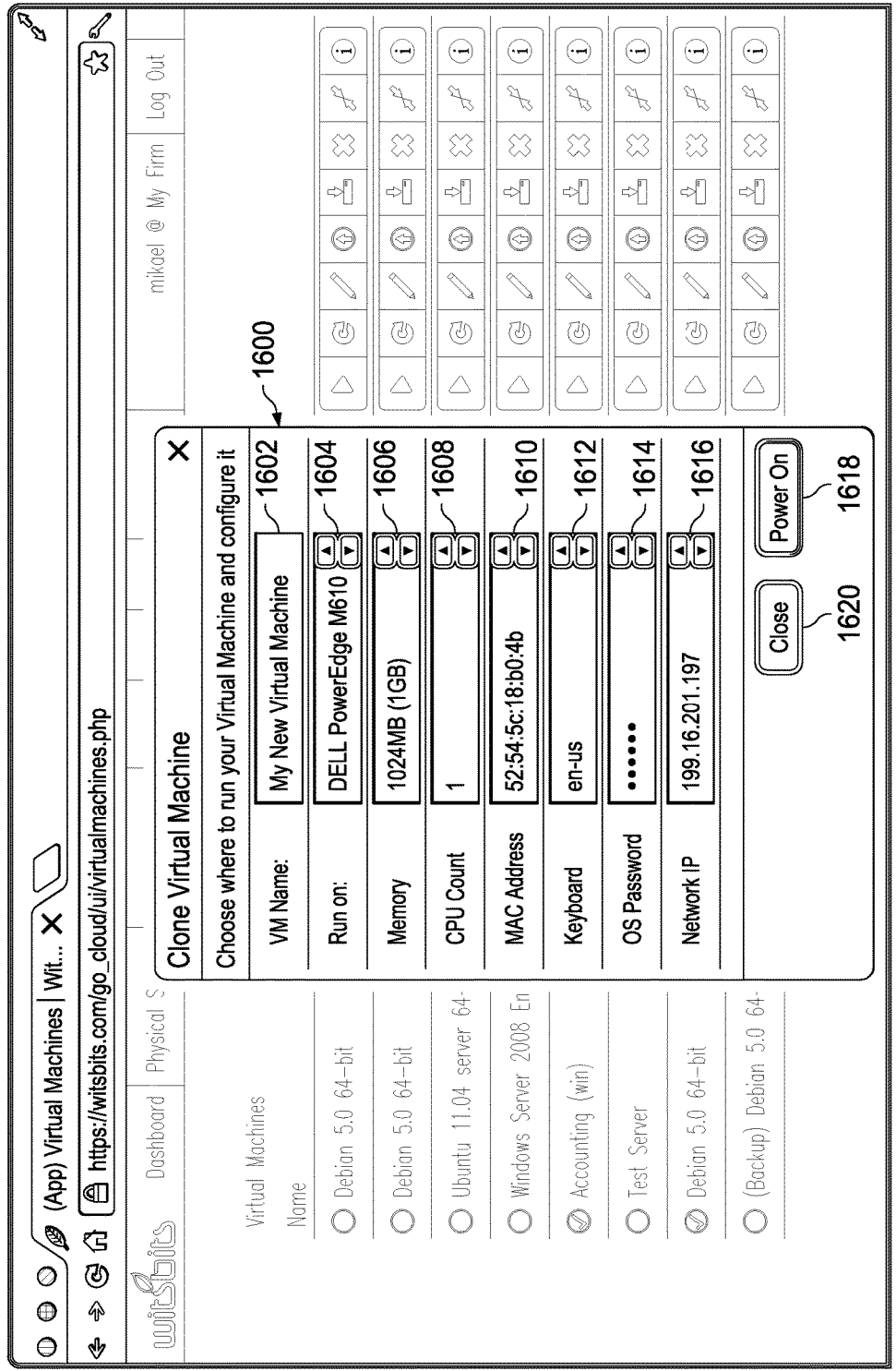
FIG. 16 shows a screen shot with an illustrative login pop-up window to enable a user to clone or copy a virtual machine from the hosted system to a host server.

FIG. 16 shows a screen shot with an illustrative pop-up window 1600 to enable a user to clone or copy a virtual machine from the virtualization system to a host system. The pop-up window 1600 may include a text entry field 1602 that allows the user to enter a name for the virtual machine. A GUI element 1604, in this case a drop-down menu, may enable a user to select a physical computer on which to copy or move the guest system. A GUI element 1606 may enable the user to select memory size (e.g., 1024 MB) for the virtual machine. A GUI element 1608 may enable the user to select a number of central processing units (CPUs) for the virtual machine. A text entry field 1610 may enable a user to enter a MAC Address for the virtual machine. A GUI element 1612 may enable a user to enter a keyboard type. A text entry field 1614 may enable a user to enter a password for the guest systems operating system. A GUI element 1616 may be provided for the user to select a network IP address of a physical computer.

Once the user has entered the information, the user may select a "Power On" soft button 1618 to cause the system to perform the copy or move the guest system, configure the virtual machine, and execute the virtual machine. Alternatively, the user may select a "close" soft-button 1620 to abort the process. It should be understood that the virtual machine may be one or more files that include instructions that, when executed, causes the physical computer to execute the guest system.

Figure 17:
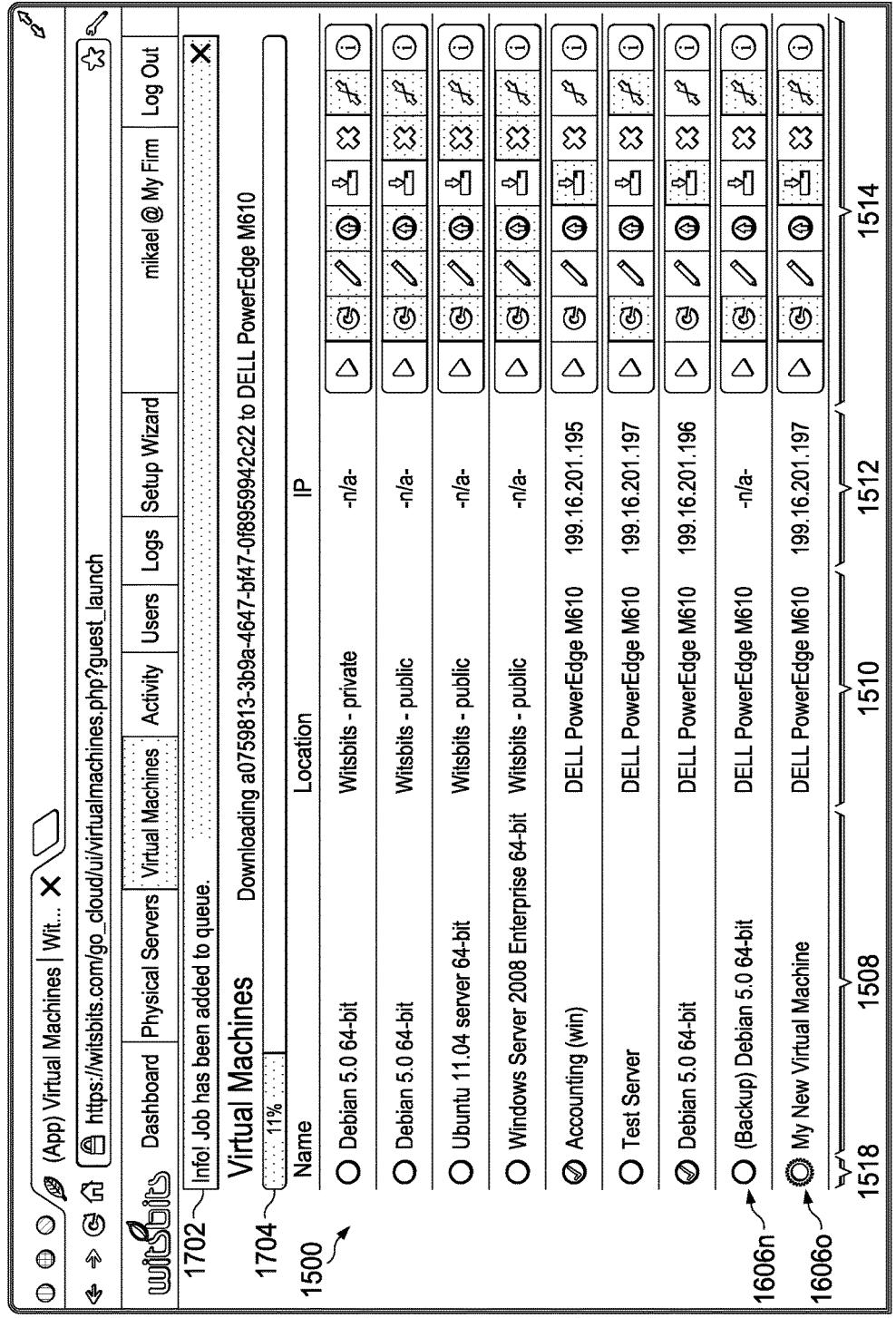
FIG. 17 is a screen shot of the GUI showing a virtual machine being downloaded or cloned onto a host server.

FIG. 17 is a screen shot of the GUI 1500 showing a virtual machine being downloaded or cloned onto a host system. As shown, a data record 1606o has been added to the virtual machine data records 1506. A status indicator 1702 shows that a job has been added to a queue, and a download bar 1704 shows a percentage of the guest system that has been downloaded to the host system. An associated status indicator 1518 also shown that the server is currently being downloaded.

FIG. 18 is a screen shot of the GUI 1500 showing that the virtual machine has been downloaded and is now running on the host system. The virtual machine or server is named "My New Virtual Machine" and the associated status indicator shows that the virtual machine is online and running.

The previous description is of a preferred embodiment for implementing the invention, and the scope of the invention should not necessarily be limited by this description. The scope of the present invention is instead defined by the following claims.

What is claimed is:

1. A system for establishing and managing virtual servers on a plurality of host servers, said system comprising:
   a storage unit configured to store a virtual server;
   an input/output (I/O) unit configured to communicate over a communications network;
   a processing unit in communication with said storage unit and I/O unit, and configured to:
   process a command received from an administrator system of a customer via a communications network, the command including a request to communicate a virtual server stored on said storage unit to a host server of a customer;
   access the virtual server stored on the storage unit in response to processing the command;
   communicate the virtual server via said I/O unit and communications network to the host servers for execution thereon;
   receive data from the host server, the data being associated with a boot key that is in communication with the host server;
   determine whether the boot key is a most recent boot key software configuration; and
   in response to determining that the boot key does not have the most recent boot key software configuration, downloading the most recent boot key software configuration to the host server for updating the boot key.

2. The system according to claim 1, wherein said processing unit is further configured to:
   provide a user of the administrator system with a graphical user interface; and
   enable the user to submit a command via the graphical user interface for said processing unit to perform in communicating with the host server.

3. The system according to claim 2, wherein said processing unit is configured to provide a queue with other commands to be performed by said processing unit, at least one other command to cause said processing unit to communicate with another host server of another customer.

4. A system for establishing and managing virtual servers on a plurality of host servers, said system comprising:
   a storage unit configured to store a virtual server;
   an input/output (I/O) unit configured to communicate over a communications network;

a processing unit in communication with said storage unit and I/O unit, and configured to:
  process a command received from an administrator system of a customer via a communications network, the command including a request to communicate a virtual server stored on said storage unit to a host server of a customer;
  access the virtual server stored on the storage unit in response to processing the command;
  communicate the virtual server via said I/O unit and communications network to the host servers for execution thereon;
store the command with an operation to be performed on the host server;
in response to receiving a request from the host server, perform the command; and
communicate with the host server in response to performing the command.

5. A system for establishing and managing virtual servers on a plurality of host servers, said system comprising:
a storage unit configured to store a virtual server;
an input/output (I/O) unit configured to communicate over a communications network;
a processing unit in communication with said storage unit and I/O unit, and configured to:
  process a command received from an administrator system of a customer via a communications network, the command including a request to communicate a virtual server stored on said storage unit to a host server of a customer;
  access the virtual server stored on the storage unit in response to processing the command;
  communicate the virtual server via said I/O unit and communications network to the host servers for execution thereon;
  collect status data of the virtual server being executed by the host server; and
  enable a user of the administrator system to view status of the virtual server.

* * * * *